(12) United States Patent
Liu et al.

(10) Patent No.: US 12,453,746 B2
(45) Date of Patent: Oct. 28, 2025

(54) USE OF AKKERMANSIA MUCINIPHILA IN PREPARATION OF PHARMACEUTICAL COMPOSITION OR HEALTH CARE PRODUCT COMPOSITION FOR IMPROVING METABOLIC SYNDROME

(71) Applicant: GUANGZHOU ZHIYI BIOTECHNOLOGY CO., LTD., Guangzhou (CN)

(72) Inventors: Yangyang Liu, Guangzhou (CN); Lijun Zheng, Guangzhou (CN); Ping Li, Guangzhou (CN); Gaobo Kuang, Guangzhou (CN); Xiaomin Yi, Guangzhou (CN); Ye Wang, Guangzhou (CN); Fachao Zhi, Guangzhou (CN)

(73) Assignee: GUANGZHOU ZHIYI BIOTECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/871,201

(22) PCT Filed: Jun. 8, 2023

(86) PCT No.: PCT/CN2023/099224
§ 371 (c)(1),
(2) Date: Dec. 3, 2024

(87) PCT Pub. No.: WO2023/237067
PCT Pub. Date: Dec. 14, 2023

(65) Prior Publication Data
US 2025/0170187 A1    May 29, 2025

(30) Foreign Application Priority Data
Jun. 8, 2022    (CN) .......................... 202210642471.7

(51) Int. Cl.
*A61K 35/74*    (2015.01)
*A61K 31/40*    (2006.01)
*A61P 3/00*    (2006.01)

(52) U.S. Cl.
CPC .............. *A61K 35/74* (2013.01); *A61K 31/40* (2013.01); *A61P 3/00* (2018.01)

(58) Field of Classification Search
None
See application file for complete search history.

(56) References Cited

FOREIGN PATENT DOCUMENTS

| | | |
|---|---|---|
| CN | 104918626 A | 9/2015 |
| CN | 110964650 A | 4/2020 |
| CN | 114832019 A | 8/2022 |
| CN | 114949004 A | 8/2022 |
| CN | 115252651 A | 11/2022 |
| CN | 115381859 A | 11/2022 |
| CN | 116059254 A | 5/2023 |
| CN | 116115647 A | 5/2023 |
| CN | 116270756 A | 6/2023 |
| WO | WO 2023/237067 A1 | 12/2023 |

OTHER PUBLICATIONS

CN115381859 (Jun. 8, 2022; IDS filed Dec. 3, 2024; English translation.*
GenBank Accession No. OQ472320.1, 2023.
Hou, et al. "Safety Evaluation and Probiotic Potency Screening of *Akkermansia muciniphila* Strains Isolated from Human Feces and Breast Milk", Microbiology Spectrum, vol. 11, No. 2, Apr. 2023.
International Search Report and Written Opinion for PCT/CN2023/099224, dated Oct. 7, 2023, 8 pages.
Liu, et al. "Relationship between *Akkermansia muciniphila* and Metabolic Diseases", Journal of Hygiene Research, vol. 50, No. 6, Nov. 30, 2021.
Office Action issued in Chinese application No. 202210642471.7, dated Feb. 29, 2024, 9 pages.
Peng, et al. "Therapeutic Perspectives of Intestinal Probiotics *A. muciniphila* in Metabolic Disorders", Acta Pharmaceutica Sinica, vol. 54, No. 5, May 2019.
Shang et al. "Dietary fucoidan improves metabolic syndrome in association with increased *Akkermansia* population in the gut microbiota of high-fat diet-fed mice", Journal of Functional Foods 28 (2017) 138-146.
Ti, et al. "Effects of *Lactobacillus casei* SY13 and Its Symbiotic on the Abundance of *Akkermansia muciniphila* in Mice Intestine Tract", Science and Technology of Food Industry, vol. 39, No. 10, May 2018.
Wan et al. "Relationship between *Akkermansia muciniphila* and obesity", Academic Journal of Second Military Medical University, Feb. 2019, vol. 40, No. 2.

* cited by examiner

*Primary Examiner* — Brian Gangle

(74) *Attorney, Agent, or Firm* — Quarles & Brady, LLP

(57) ABSTRACT

Provided here relates to use of *Akkermansia muciniphila* or a composition containing *Akkermansia muciniphila* in preparation of a pharmaceutical composition or a health care product composition for improving metabolic syndrome. The *Akkermansia muciniphila* is *Akkermansia muciniphila* AM06, *Akkermansia muciniphila* AM02, or a combination thereof, the deposit number of *Akkermansia muciniphila* AM06 being CGMCC No. 22793, and the deposit number of the *Akkermansia muciniphila* AM02 being CGMCC No. 22794. The improvement of a metabolic syndrome comprises preventing and/or treating the metabolic syndrome.

20 Claims, 5 Drawing Sheets
Specification includes a Sequence Listing.

USE OF AKKERMANSIA MUCINIPHILA IN PREPARATION OF PHARMACEUTICAL COMPOSITION OR HEALTH CARE PRODUCT COMPOSITION FOR IMPROVING METABOLIC SYNDROME

CROSS-REFERENCE TO RELATED APPLICATIONS

This application is a 35 U.S.C. § 371 national phase application of PCT/CN2023/099224, filed on Jun. 8, 2023, entitled "Use of *Akkermansia Muciniphila* in Preparation of Pharmaceutical Composition or Health Care Product Composition for Improving Metabolic Syndrome", which claims the benefit of Chinese Application No. CN 202210642471.7, filed Jun. 8, 2022, both of which are incorporated herein by reference in their entireties.

REFERENCE TO AN ELECTRONIC SEQUENCE LISTING

Incorporated by reference herein in its entirety is the Sequence Listing entitled "196088_00032.xml", size of 5.6 kilobytes, date of creation Apr. 2, 2024.

TECHNICAL FIELD

The present application relates to the technical field of prevention and treatment of sugar metabolic syndrome and the technical field of healthcare food, in particular relates to use of *Akkermansia muciniphila* in the preparation of a pharmaceutical composition or a healthcare product composition for improving metabolic syndrome, further relates to use of a composition comprising *Akkermansia muciniphila* in the preparation of or as a medication for preventing and treating metabolic syndrome or in the preparation of or as a healthcare food for improving metabolic syndrome, and further relates to a composition comprising *Akkermansia muciniphila*.

BACKGROUND

Metabolic syndrome (MetS or MS), also known as syndrome X, insulin resistance, etc., is actually not a single disease but rather a group of cardiovascular risk factors, slightly differently defined by different organizations. The three most frequently cited definitions in surveys and medical care projects are those from WHO (1999), NCEP (2005), and IDF (2006). Furthermore, organizations such as AACE and EGIR have also proposed definitions of metabolic syndrome. The morbidity of metabolic syndrome is generally positively correlated with the morbidity of obesity and type 2 diabetes (one of the consequences of MetS). The prevalence estimates for metabolic syndrome vary by the criteria used to define MetS. According to the IDF diabetes atlas, the global prevalence of diabetes was 8.8% by 2015 and is expected to increase to 10.4% by 2040. But since the morbidity of MetS is approximately three times that of diabetes, its global prevalence is estimated to be about one-quarter of the world population. According to this ratio, it is estimated that more than 1 billion people in the world are now affected by metabolic syndrome.

Treatment for metabolic syndrome includes lifestyle interventions and symptomatic drug therapy. Lifestyle interventions include diet, exercise, etc., the execution of which requires precise and personalized protocols. Additionally, due to individual differences between patients, adherence to these interventions is often a challenge. The medicament for symptoms includes hypoglycemic drugs, antihypertensive drugs, hypolipidemic drugs, and the like. Such drug therapy has side effects, may not address other symptoms and can even cause other abnormal metabolic indexes.

Based on the above, there is a need for further development of new medicaments for the prevention and treatment of metabolic syndrome.

SUMMARY

Based on the above, the present application is intended to provide use of *Akkermansia muciniphila* in the preparation of a pharmaceutical composition or a healthcare product composition for improving metabolic syndrome, and also provide use of a composition comprising *Akkermansia muciniphila* in the preparation of or as a medication for preventing and treating metabolic syndrome or in the preparation of or as a healthcare food for improving metabolic syndrome, wherein the *Akkermansia muciniphila* is *Akkermansia muciniphila* AM06 (with a deposit number of CGMCC No. 22793) and *Akkermansia muciniphila* AM02 (with a deposit number of CGMCC No. 22794).

In a first aspect of the present application, provided is use of *Akkermansia muciniphila* for improving metabolic syndrome, wherein the *Akkermansia muciniphila* is *Akkermansia muciniphila* AM06, *Akkermansia muciniphila* AM02, or a combination thereof, wherein, the *Akkermansia muciniphila* AM06 was deposited in the China General Microbiological Culture Collection Center on Jun. 28, 2021 with a deposit number of CGMCC No. 22793; the *Akkermansia muciniphila* AM02 was deposited in the China General Microbiological Culture Collection Center on Jun. 28, 2021 with a deposit number of CGMCC No. 22794; improving metabolic syndrome includes at least one of preventing and treating metabolic syndrome;

optionally, the *Akkermansia muciniphila* AM06 and the *Akkermansia muciniphila* AM02 are each independently live bacteria, inactivated bacteria, or a combination thereof.

In a second aspect of the present application, provided is use of *Akkermansia muciniphila* in the preparation of a composition for improving metabolic syndrome, wherein the composition for improving metabolic syndrome is a pharmaceutical composition or a healthcare product composition, that is, provided is use of *Akkermansia muciniphila* in the preparation of a pharmaceutical composition or a healthcare product composition for improving metabolic syndrome. The *Akkermansia muciniphila* is *Akkermansia muciniphila* AM06, *Akkermansia muciniphila* AM02, or a combination thereof, wherein, the *Akkermansia muciniphila* AM06 was deposited in the China General Microbiological Culture Collection Center on Jun. 28, 2021 with a deposit number of CGMCC No. 22793; the *Akkermansia muciniphila* AM02 was deposited in the China General Microbiological Culture Collection Center on Jun. 28, 2021 with a deposit number of CGMCC No. 22794.

In some embodiments, the *Akkermansia muciniphila* AM06 and the *Akkermansia muciniphila* AM02 are each independently live bacteria, inactivated bacteria with a complete morphological structure, inactivated bacteria, or a combination thereof.

In some embodiments, improving metabolic syndrome includes preventing and/or treating metabolic syndrome, i.e., improving metabolic syndrome includes at least one of preventing and treating metabolic syndrome.

In some embodiments, the composition for improving metabolic syndrome is a pharmaceutical composition comprising the *Akkermansia muciniphila* and a pharmaceutically acceptable carrier;
    optionally, the pharmaceutical composition is a medication or a pharmaceutical formulation;
    optionally, the dosage form of the medication or the pharmaceutical formulation is a tablet, a capsule, a granule, a pill, an ointment, a solution, a suspension, an emulsion, a cream, a spray, a drop, a patch, or a tube feed formulation;
    optionally, the medication or the medicament is suitable for use in humans or other mammals.

In some embodiments, the composition for improving metabolic syndrome is a healthcare product composition comprising the *Akkermansia muciniphila* and edible raw and auxiliary materials;
    optionally, the healthcare product composition is a healthcare food;
    optionally, the dosage form of the healthcare food is a pill, a tablet, a granule, a capsule, a solution, a suspension, or an emulsion;
    optionally, the healthcare food includes one or more of milk powder, cheese, curd, yogurt, ice cream, and fermented cereals, or the healthcare food is an animal food.

In a third aspect of the present application, provided is use of a composition comprising *Akkermansia muciniphila* for improving metabolic syndrome, wherein the *Akkermansia muciniphila* is as defined in the second aspect of the present application and may further be as defined below;
    optionally, the composition comprising *Akkermansia muciniphila* is a pharmaceutical composition or a healthcare product composition.

In some embodiments, the composition comprising *Akkermansia muciniphila* is a pharmaceutical composition comprising the *Akkermansia muciniphila* and a pharmaceutically acceptable carrier;
    optionally, the pharmaceutical composition is a medication or a pharmaceutical formulation; optionally, the dosage form of the medication or the pharmaceutical formulation is a tablet, a capsule, a granule, a pill, an ointment, a solution, a suspension, an emulsion, a cream, a spray, a drop, a patch, or a tube feed formulation;
    optionally, the medication or the medicament is suitable for use in humans or other mammals.

In some embodiments, the composition comprising *Akkermansia muciniphila* is a healthcare product composition comprising the *Akkermansia muciniphila* and edible raw and auxiliary materials;
    optionally, the healthcare product composition is a healthcare food;
    optionally, the dosage form of the healthcare food is a pill, a tablet, a granule, a capsule, a solution, a suspension, or an emulsion;
    optionally, the healthcare food includes one or more of milk powder, cheese, curd, yogurt, ice cream, and fermented cereals, or the healthcare food is an animal food.

In a fourth aspect of the present application, provided is use of a composition comprising *Akkermansia muciniphila* in the preparation of or as a medication or a pharmaceutical formulation for preventing or treating metabolic syndrome or in the preparation of or as a healthcare food for improving metabolic syndrome, wherein the *Akkermansia muciniphila* is as defined in the second aspect of the present application and may further be as defined below.

In some embodiments, provided is use of a composition comprising *Akkermansia muciniphila* in the preparation of or as a medication or a pharmaceutical formulation for preventing or treating metabolic syndrome, wherein the *Akkermansia muciniphila* is as defined in the second aspect of the present application and may further be as defined below.

In some embodiments, the composition comprising *Akkermansia muciniphila* is a pharmaceutical composition comprising the *Akkermansia muciniphila* and a pharmaceutically acceptable carrier;
    optionally, the dosage form of the medication or the pharmaceutical formulation is a tablet, a capsule, a granule, a pill, an ointment, a solution, a suspension, an emulsion, a cream, a spray, a drop, a patch, or a tube feed formulation;
    optionally, the medication or the pharmaceutical formulation is suitable for use in humans or other mammals.

In some other embodiments, provided is use of a composition comprising *Akkermansia muciniphila* in the preparation of or as a healthcare food for improving metabolic syndrome, wherein the *Akkermansia muciniphila* is as defined in the second aspect of the present application and may further be as defined below.

In some embodiments, the composition comprising *Akkermansia muciniphila* is a healthcare product composition comprising the *Akkermansia muciniphila* and edible raw and auxiliary materials;
    optionally, the dosage form of the healthcare food is a pill, a tablet, a granule, a capsule, a solution, a suspension, or an emulsion;
    optionally, the healthcare food includes one or more of milk powder, cheese, curd, yogurt, ice cream, and fermented cereals, or the healthcare food is an animal food.

In some embodiments, based on any suitable embodiment of the present application (including any suitable embodiment of the third aspect and the fourth aspect), the composition comprising *Akkermansia muciniphila* is a composite probiotic that further comprises a probiotic different from the *Akkermansia muciniphila;*
    optionally, the probiotic different from the *Akkermansia muciniphila* includes one or more of *Bacteroides fragilis, Saccharomyces boulardii, Christensenella minuta, Lactobacillus casei, Lactobacillus rhamnosus, Lactobacillus gasseri, Lactobacillus plantarum, Lactobacillus curvatus, Bifidobacterium infantis, Bifidobacterium longum,* and *Bifidobacterium breve.*

In some embodiments, based on any suitable embodiment of the present application (including any suitable embodiment of the third aspect and the fourth aspect), the composition comprising *Akkermansia muciniphila* further comprises a second active ingredient that is a medicament different from the *Akkermansia muciniphila;*
    optionally, the second active ingredient comprises one or more of orlistat, metformin, thiazolidinedione, fibrates, statins, and calcium ion antagonists, wherein the fibrates comprise one or more of fenofibrate, bezafibrate, and gemfibrozil; the statins comprise one or more of atorvastatin, lovastatin, simvastatin, pravastatin, and fluvastatin;
    further optionally, the second active ingredient comprises atorvastatin calcium.

In a fifth aspect of the present application, provided is *Akkermansia muciniphila* for improving metabolic syndrome, wherein the *Akkermansia muciniphila* is as defined in the second aspect of the present application and may further be as defined below.

In some embodiments, improving metabolic syndrome includes at least one of preventing and treating metabolic syndrome.

In a sixth aspect of the present application, provided is a composition for improving metabolic syndrome, wherein the composition for improving metabolic syndrome is the composition comprising *Akkermansia muciniphila* as defined in the third aspect of the present application or the fourth aspect of the present application, and may further be as defined below.

In some embodiments, improving metabolic syndrome includes at least one of preventing and treating metabolic syndrome.

In a seventh aspect of the present application, provided is a composition comprising *Akkermansia muciniphila*.

In some embodiments, provided is a composition comprising *Akkermansia muciniphila*, which comprises the *Akkermansia muciniphila* as defined in the second aspect of the present application and a second active ingredient;
  optionally, the second active ingredient comprises one or more of orlistat, metformin, thiazolidinedione, fibrates, statins, and calcium ion antagonists, wherein the fibrates comprise one or more of fenofibrate, bezafibrate, and gemfibrozil; the statins comprise one or more of atorvastatin, lovastatin, simvastatin, pravastatin, and fluvastatin;
  further optionally, the second active ingredient comprises atorvastatin calcium.

In some other embodiments, provided is a composition comprising *Akkermansia muciniphila*, which is a composite probiotic. The composite probiotic comprises the *Akkermansia muciniphila* according to the second aspect of the present application and a probiotic different from the *Akkermansia muciniphila*;
  optionally, the probiotic different from the *Akkermansia muciniphila* includes one or more of *Bacteroides fragilis, Saccharomyces boulardii, Christensenella minuta, Enterococcus hirae, Lactobacillus casei, Lactobacillus rhamnosus, Lactobacillus gasseri, Lactobacillus plantarum, Lactobacillus curvatus, Bifidobacterium infantis, Bifidobacterium longum,* and *Bifidobacterium breve;*
  further optionally, the composition comprising *Akkermansia muciniphila* further comprises a second active ingredient that is as previously defined.

In an eighth aspect of the present application, provided is a method for improving metabolic syndrome. In some embodiments, provided is a method for improving metabolic syndrome, which comprises administering to a subject *Akkermansia muciniphila*, or administering to a subject a composition comprising *Akkermansia muciniphila*, or administering to a subject a medication comprising *Akkermansia muciniphila*, or administering to a subject a healthcare food comprising *Akkermansia muciniphila*, wherein the *Akkermansia muciniphila* is as defined in the second aspect of the present application.

In some embodiments, the method for improving metabolic syndrome comprises administering to a subject a therapeutically effective amount of the *Akkermansia muciniphila*, or administering to a subject a therapeutically effective amount of a pharmaceutical composition comprising the *Akkermansia muciniphila*, or administering to a subject a therapeutically effective amount of a medication comprising the *Akkermansia muciniphila*.

In some embodiments, the method for improving metabolic syndrome comprises administering to a subject a healthcare effective amount of the *Akkermansia muciniphila*, or administering to a subject a healthcare effective amount of a healthcare product composition comprising the *Akkermansia muciniphila*, or administering to a subject a healthcare effective amount of a healthcare food comprising the *Akkermansia muciniphila*.

In some embodiments, the composition comprising *Akkermansia muciniphila* is as defined in the third aspect of the present application or the fourth aspect of the present application.

In some embodiments, the method for improving metabolic syndrome includes at least one of preventing and treating metabolic syndrome.

The inventors of the present application obtained strains AM06 (with a deposit number of CGMCC No. 22793) and AM02 (with a deposit number of CGMCC No. 22794) through separation. Both belong to *Akkermansia muciniphila* and are identified as new strains different from the *Akkermansia muciniphila* such as ATCC BAA-835 (standard strain) according to comprehensive analysis such as 16S rRNA analysis, morphological analysis, metabolite component analysis, efficacy analysis (such as tolerance to artificial gastric juice and artificial intestinal juice, capability of inhibiting inflammatory factors to damage tight junction proteins of intestinal cells, and effect of inhibiting LPS to induce liver section hepatitis) and the like.

The inventors have found that the *Akkermansia muciniphila* AM06 and/or AM02 ("AM06 and/or AM02" herein refers to AM06, AM02, or a combination of AM06 and AM02) obtained above through separation can be used for improving metabolic syndrome, including preventing and treating (preventing and/or treating, i.e., at least one of preventing and treating) metabolic syndrome. Therefore, the *Akkermansia muciniphila* AM06 and/or AM02 obtained above through separation can be used for preparing a pharmaceutical composition or preparing a healthcare product composition, and further can be used for preparing a medication or healthcare food. The *Akkermansia muciniphila* AM06 and/or AM02 obtained above through separation can reduce the obesity degree and insulin resistance of rats, regulate blood pressure, and improve the metabolism of blood sugar and blood fat, effectively preventing and treating metabolic syndrome.

BRIEF DESCRIPTION OF THE DRAWINGS

In order to more clearly illustrate the technical solutions in the embodiments of the present application and to more fully understand the present application and the advantages thereof, the drawings used in the description of the examples will be briefly introduced below. It is obvious that the drawings in the following description are only some examples of the present application, and that for a person skilled in the art, other drawings can also be derived from them without inventive effort.

Figure 1:
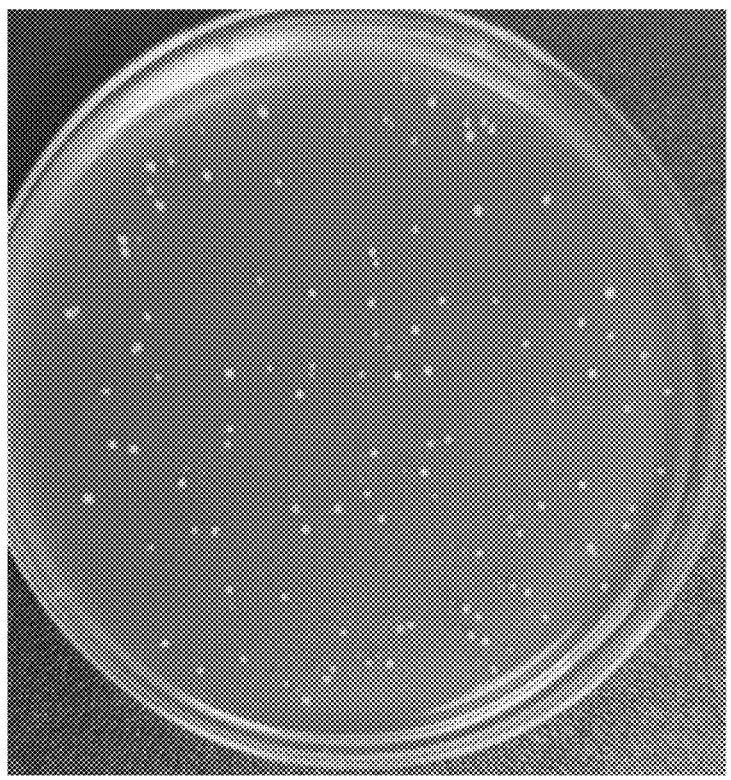
FIG. 1 is a picture showing the colony characteristics of the *Akkermansia muciniphila* AM02 cultured in an example of the present application.

The *Akkermansia muciniphila* AM06 obtained in the present application through separation was classified as *Akkermansia muciniphila*, and was deposited in the China General Microbiological Culture Collection Center (address: No. 3, Yard No. 1, West Beichen Road, Chaoyang District, Beijing) on Jun. 28, 2021 with a deposit number of CGMCC No. 22793; the strain was received and registered in the collection center on Jun. 28, 2021, and was detected as a live strain by the collection center on Jun. 28, 2021.

The *Akkermansia muciniphila* AM02 obtained in the present application through separation was classified as *Akkermansia muciniphila*, and was deposited in the China General Microbiological Culture Collection Center (address: No. 3, Yard No. 1, West Beichen Road, Chaoyang District, Beijing) on Jun. 28, 2021 with a deposit number of CGMCC No. 22794; the strain was received and registered in the collection center on Jun. 28, 2021, and was detected as a live strain by the collection center on Jun. 28, 2021.

DETAILED DESCRIPTION

The present application will be described in further detail below with reference to the drawings, embodiments, and examples. It should be understood that the embodiments and examples are merely intended to illustrate the present application and are not intended to limit the scope of the present application. The embodiments and examples are provided for the purpose of making the content disclosed in the present application more thorough and complete. It should also be understood that the present application may be implemented in many different forms and is not limited to the embodiments and examples described herein, and that various changes or modifications may be made by a person skilled in the art without departing from the spirit and scope of the present application, and the resulting equivalents are within the scope of the present application. Furthermore, in the following description, numerous details are set forth in order to provide a more thorough understanding of the present application. It should be understood that the present application may be practiced without one or more of the details.

Unless otherwise defined, all technical and scientific terms used herein have the same meaning as commonly understood by those skilled in the art to which the present application belongs.

The terms used herein in the specification of the present application are for the purpose of describing embodiments and examples only and are not intended to limit the present application.

Terminology

Unless otherwise indicated or contradicted, terms or phrases used herein have the following meanings:

The scope of the terms "and/or" and "or/and" as used herein includes any item in two or more associated listed items, and also includes any and all combinations of the two or more associated listed items. The any and all combinations include a combination of any two associated listed items, any more associated listed items, or all associated listed items. It should be noted that when using at least two conjunction pairings selected from "and/or" and "or/and" to connect at least three items, the technical solution of the present application undoubtedly includes the solutions connected by "logical AND" and the solution connected by "logical OR". For example, "A and/or B" includes three parallel schemes: A, B, and "a combination of A and B". For another example, a technical solution of "A and/or B and/or C and/or D" includes any item in A, B, C, and D (i.e., a technical solution connected by "logical OR"), and also includes any and all combinations of A, B, C, and D, which means including a combination of any two items or any three items in A, B, C, and D, and also including a four-item combination of A, B, C, and D (i.e., a technical solution connected by "logical AND").

Unless otherwise specified, "a plurality of", "multiple" and the like related in the present application mean greater than 2 or equal to 2 in number. For example, "one or more" means one or two or more.

The "a combination thereof", "any combination thereof", and the like used in the present application include all suitable combinations of any two or more of the listed items.

In the present application, unless otherwise stated, "one or more" means any one of the listed items or any combination of the listed items. Similarly, unless otherwise stated, "one or more" or other expressions indicating "one or more" should be understood in the same way.

In the present application, "suitable" in "suitable combination", "suitable mode", "any suitable mode", "any suitable combination", and the like, is defined by the ability to implement the technical solution of the present application, solve the technical problem of the present application, and achieve the expected technical effect of the present application.

In the present application, "preferably", "better", and "preferred" are only used to describe embodiments or examples with a better effect. It should be understood that these terms do not limit the scope of the present application, and are intended to indicate relationships between different technical solutions in terms of contents, rather than restrict any preceding technical solutions. If multiple "preferably" appear in a technical solution, unless otherwise specified and in the absence of contradictions or interdependencies, each "preferably" is independent.

In the present application, "further", "still further", "particularly", "for example", "such as", "example", "exemplify" and the like are used for descriptive purposes to indicate differences in contents, but should not be construed as limiting the scope of the present application. In the present disclosure, unless otherwise stated, A (e.g., B) indicates that B is a non-limiting example of A, and it is understood that A is not limited to B.

In the present application, "optionally" and "optional" refer to something that is not necessary, i.e., any one selected from the two parallel schemes "present" or "absent". If multiple "optionally" appear in a technical solution, unless otherwise specified and in the absence of contradictions or interdependencies, each "optionally" is independent.

In the present application, the terms "first", "second", "third", "fourth", "fifth", "sixth", "seventh", etc. in "first aspect", "second aspect", "third aspect", "fourth aspect", "fifth aspect", "sixth aspect", "seventh aspect", etc. are used for descriptive purposes only and are not to be construed as indicating or implying a relative importance or quantity, nor as implying any indication of the importance or quantity of the technical features indicated. Moreover, "first", "second", "third", etc. are used merely for purposes of non-exhaustive enumeration and description, and should not be construed as a closed limitation of quantity.

In the present application, the technical features described in the open-ended mode include a closed-ended technical solution consisting of the listed features, and also include an open-ended technical solution including the listed features.

As used herein, the terms "containing", "including", and "comprising" are synonymous, which are inclusive or open-ended, and do not exclude additional and unrecited members or time sequence features. The members are, for example, materials or components, structures, elements, instruments, etc.; non-limiting examples of time sequence features are actions, conditions under which actions occur, timing, states, etc.

In the present application, when a numerical interval (i.e., a numerical range) is related, unless otherwise stated, the distribution of values that are selectable within the numerical interval is considered to be continuous and includes both the endpoints of the numerical interval (i.e., the minimum and maximum values) and each value between these two endpoints. Unless otherwise indicated, when a numerical interval only refers to integers within the numerical interval, including both endpoints of the numerical range and each integer between the two endpoints, it is equivalent to the direct recitation of each integer. When multiple numerical ranges are provided to describe a feature or characteristic, the numerical ranges may be combined. In other words, unless otherwise indicated, all numerical ranges disclosed herein are to be understood to include any and all subranges subsumed therein. The "numerical value" in the numerical interval may be any quantitative value such as a number, a percentage, a ratio, or the like. A "numerical interval" is allowed to broadly include quantitative ranges such as percentage ranges, proportional ranges, ratio ranges, and the like.

Unless otherwise specified, the temperature parameter in the present application is allowed to be constant temperature treatment or to vary within a certain temperature interval. It should be understood that the constant temperature treatment allows the temperature to fluctuate within the accuracy range controlled by the instrument. It is allowed to fluctuate in a range such as ±5° C., ±4° C., ±3° C., ±2° C., and ±1° C.

In the present application, the term "room temperature" generally means 4° C. to 35° C., preferably 20° C.±5° C. In some embodiments of the present application, room temperature is 20° C. to 30° C.

In the present application, when a unit of the data range is related, if only the right end point is followed by a unit, the units of the left end point and the right end point are the same. For example, 3-5 h indicates that the units of the left end point "3" and the right end point "5" are both h (hour).

All documents mentioned in the present application are incorporated by reference, just as each document is cited separately as a reference. The entire content and purpose of the cited references in the present application are incorporated by reference unless they conflict with the objectives and/or technical solutions of the present application. When a cited reference is related in the present application, definitions of relevant technical features, terms, nouns, phrases, and the like in the cited reference are also incorporated herein. When a cited reference is related in the present application, the examples, preferred embodiments and alternatives of the cited relevant technical features are also incorporated in the present application as references, but only to the extent that they enable the implementation of the present application. It should be understood that when a reference conflicts with the description of the present application, the present application shall prevail or the reference shall be adaptively modified according to the description of the present application.

In the present application, when "in some embodiments according to any aspect of the present application", "in some embodiments" recited in any aspect, and "in some examples" recited in any aspect are related, unless otherwise stated and unless otherwise contradicted or conflicting, the features described in the foregoing embodiments or examples may be combined with aspects combinable in any aspect of the present application, rather than being limited to technical solutions in one aspect, i.e., the features described in the foregoing embodiments or examples may also be combined with technical solutions in another aspect.

In the present application, unless otherwise stated, the description of the "term" recited at any position applies to the context of the present application. For example, relevant description of the terms "composition", "medicament", "pharmaceutical composition", "medication", "pharmaceutically acceptable", "pharmaceutically acceptable carrier", "carrier", "healthcare product", "healthcare food", "healthcare product composition", "food", "healthcare product composition for improving metabolic syndrome", "edible raw and auxiliary materials", "therapeutically effective amount", "subject", "patient", "other pharmaceutically active ingredient" and the like recited in the second aspect of the present application applies to the context of the present application. For another example, relevant description of the terms "second active ingredient", "engineered bacteria of the *Akkermansia muciniphila* described herein", "composite probiotic", "second pharmaceutically active ingredient", "composition comprising *Akkermansia muciniphila*", "other pharmaceutically active ingredients" and the like recited in the fourth aspect of the present application applies to the context of the present application.

In the present disclosure, when a method flow involves multiple steps, the performance of the steps is not strictly limited by the order in which they are performed, and the steps may be performed in an order other than the order described, unless otherwise specifically indicated herein. Moreover, any one step may include a plurality of sub-steps or a plurality of stages. Such sub-steps or stages are not necessarily performed at the same moment, but may be performed at different moments, and such sub-steps or stages are not necessarily performed in a sequential order, but may be performed in turn or alternately or simultaneously with other steps or some of the sub-steps or stages of other steps.

The inventors of the present application obtained strains AM06 (with a deposit number of CGMCC No. 22793) and AM02 (with a deposit number of CGMCC No. 22794) through separation. Both belong to *Akkermansia muciniphila* and are identified as new strains different from the *Akkermansia muciniphila* such as ATCC BAA-835 (standard strain) according to comprehensive analysis such as 16S rRNA analysis, morphological analysis, metabolite component analysis, efficacy analysis (such as tolerance to artificial gastric juice and artificial intestinal juice, capability of inhibiting inflammatory factors to damage tight junction proteins of intestinal cells, and effect of inhibiting LPS to induce liver section hepatitis) and the like.

The inventors have found that the *Akkermansia muciniphila* AM06 and/or AM02 ("AM06 and/or AM02" herein refers to AM06, AM02, or a combination of AM06 and AM02) obtained above through separation can be used for improving metabolic syndrome, including preventing and treating (preventing and/or treating, i.e., at least one of preventing and treating) metabolic syndrome. Therefore, the *Akkermansia muciniphila* AM06 and/or AM02 obtained above through separation can be used for preparing a pharmaceutical composition or preparing a healthcare product composition, and further can be used for preparing a medication or healthcare food. The *Akkermansia muciniphila* AM06 and/or AM02 obtained above through separation can reduce the obesity degree and insulin resistance of rats, regulate blood pressure, and improve the metabolism of blood sugar and blood fat, effectively preventing and treating metabolic syndrome.

In the present application, the expression "improving metabolic syndrome" refers to providing a physiologically and/or pharmacologically beneficial effect on metabolic syndrome. The "improving metabolic syndrome" includes, but is not limited to, preventing and/or treating metabolic syndrome, i.e., improving metabolic syndrome includes at least one of preventing and treating metabolic syndrome.

In the present application, "*Akkermansia muciniphila*" is in accordance with the common definition in the art and includes, but is not limited to, *Akkermansia muciniphila* AM06 and AM02.

In the present application, the "*Akkermansia muciniphila*" may be a live bacterium, or may be *Akkermansia muciniphila* in which all or part of the original biological activity is retained after inactivation, genetic recombination, engineering or modification, attenuation, chemical treatment, and physical treatment, or may be a lysate of a bacterial cell, a culture (e.g., a supernatant), or a component extracted from the above culture.

The inventors of the present application obtained strains AM06 (with a deposit number of CGMCC No. 22793) and AM02 (with a deposit number of CGMCC No. 22794) through separation. Both belong to *Akkermansia muciniphila* and are identified as new strains different from the *Akkermansia muciniphila* such as ATCC BAA-835 (standard strain) according to comprehensive analysis such as 16S rRNA analysis, morphological analysis, metabolite component analysis, efficacy analysis (such as tolerance to artificial gastric juice and artificial intestinal juice, capability of inhibiting inflammatory factors to damage tight junction proteins of intestinal cells, and effect of inhibiting LPS to induce liver section hepatitis) and the like. *Akkermansia muciniphila* (*A.muciniphila*) belongs to the phylum Verucomicrobia, the family Akkermansiaceae, and the genus *Akkermansia*. *Akkermansia muciniphila* is a mucin degrading bacterium (also called as AKK or AKK bacterium), is an anaerobic, unpowered, and spore-free oval gram-negative bacterium, is suitable for growing under the conditions of 20-40° C. and pH 5.5-8.0 (the optimum temperature is 37° C., and the optimum pH is 6.5), and is commonly present in the intestinal tract of a human body. It belongs to an anaerobic bacterium, but can also tolerate a certain degree of oxygen. *Akkermansia muciniphila* can colonize the mucus layer and colon by degrading and utilizing mucin as an energy source, and further, can produce short chain fatty acids (SCFAs) by mucin degradation. The production of the short chain fatty acids (including acetate, propionate, and butyrate) plays an important role in human health.

In the present application, "the *Akkermansia muciniphila* described herein" refers specifically to *Akkermansia muciniphila* AM06, *Akkermansia muciniphila* AM02, or a combination thereof, which may be referred to as "AM06 and/or AM02". In the present application, "AM06 and/or AM02" may also be described as AM06, AM02, or a combination of AM06 and AM02.

The *Akkermansia muciniphila* AM06 was deposited in the China General Microbiological Culture Collection Center on Jun. 28, 2021 with a deposit number of CGMCC No. 22793, which can be separated by the method of Example 1 and can also be identified by one or more methods including but not limited to those of Examples 2 to 5.

In some embodiments of the present application, the colony culture features of the *Akkermansia muciniphila* AM06 include: circular protrusion, neat edges, opaque, white, and non-uniform size. Furthermore, the size of the colony is about 0.08-2.2 mm.

In some embodiments of the present application, the *Akkermansia muciniphila* AM06 is separated from breast milk.

The *Akkermansia muciniphila* AM02 was deposited in the China General Microbiological Culture Collection Center on Jun. 28, 2021 with a deposit number of CGMCC No. 22794, which can be separated by the method of Example 1 and can also be identified by one or more methods including but not limited to those of Examples 2 to 5.

In some embodiments of the present application, the colony culture features of the *Akkermansia muciniphila* AM02 of CGMCC No. 22794 include: circular protrusion, neat edges, opaque, white, and non-uniform size. Furthermore, the size of the colony is about 0.08-2.2 mm.

In some embodiments of the present application, the applicants also carry out a tolerance study of artificial gastric juice and artificial intestinal juice. In the study on the tolerance of artificial gastric juice, the numbers of live bacteria in a 0.9 wt % NaCl solution group, a pH 3 artificial gastric juice group, and a pH 2 artificial gastric juice group at 37±2° C. after anaerobic incubation for 0 h, 1.5 h, and 3 h were subjected to statistical analysis. The results shows that the artificial gastric juice tolerance of the *Akkermansia muciniphila* strain was AM02>AM06>standard strain ATCC BAA-835 in sequence. In the study and experiment on the tolerance of artificial intestinal juice, the numbers of live bacteria at 37±2° C. after anaerobic incubation for 0 h, 4 h, and 8 h were subjected to statistical analysis. The artificial intestinal juice tolerance was superior to AM06>AM02>ATCC BAA-835.

In some in vitro experiments of the present application, the *Akkermansia muciniphila* AM06 and AM02 were superior to standard strain BAA-835 in tolerance to artificial gastric juice and artificial intestinal juice, capability of inhibiting inflammatory factors to damage tight junction proteins of intestinal cells, and effect of inhibiting LPS to induce liver section hepatitis.

In some embodiments of any aspect of the present application, the *Akkermansia muciniphila* AM06 and AM02 may each independently be a live bacterium, may be an inactivated *Akkermansia muciniphila* (i.e., an inactivated bacterium, which may be wholly or partially inactivated), and may also be a lysate of a bacterial cell, a culture (e.g., a supernatant), or a component extracted from the above culture.

In some embodiments of any aspect of the present application, the *Akkermansia muciniphila* AM06 and the *Akkermansia muciniphila* AM02 are each independently live bacteria, inactivated bacteria, or a combination thereof (i.e., a combination of live and inactivated bacteria). The inactivated bacteria may be inactivated bacteria with a complete morphological structure, inactivated bacteria with an incomplete morphological structure, or a combination thereof.

In some embodiments of any aspect of the present application, the *Akkermansia muciniphila* AM06 and AM02 are each independently one or more of live bacteria, inactivated bacteria with a complete morphological structure, and inactivated bacteria with an incomplete morphological structure.

In some embodiments of any aspect of the present application, the *Akkermansia muciniphila* described herein is selected from live bacterial cells of *Akkermansia muciniphila*.

In some embodiments of any aspect of the present application, the *Akkermansia muciniphila* described herein is selected from inactivated bacteria of *Akkermansia muciniphila*.

In the present application, the case of "with a complete morphological structure" may include, but is not limited to, *Akkermansia muciniphila* which has been inactivated in whole or in part by an inactivation treatment.

In the present application, the case of "with an incomplete morphological structure" may include, but is not limited to, a lysate of a bacterial cell, a culture (e.g., a supernatant), or a component extracted from the above culture, and the like.

First aspect of the present application Provided is use of *Akkermansia muciniphila* in improving metabolic syndrome, that is, provided is a method for applying *Akkermansia muciniphila* in improving metabolic syndrome, wherein the *Akkermansia muciniphila* is *Akkermansia muciniphila* AM06, *Akkermansia muciniphila* AM02, or a combination thereof, wherein the *Akkermansia muciniphila* AM06 was deposited in the China General Microbiological Culture Collection Center on Jun. 28, 2021 with a deposit number of CGMCC No. 22793; the *Akkermansia muciniphila* AM02 was deposited in the China General Microbiological Culture Collection Center on Jun. 28, 2021 with a deposit number of CGMCC No. 22794.

In some embodiments, improving metabolic syndrome includes at least one of preventing and treating metabolic syndrome.

In some embodiments, the *Akkermansia muciniphila* AM06 and the *Akkermansia muciniphila* AM02 are each independently live bacteria, inactivated bacteria, or a combination thereof.

Second Aspect of the Present Application

In a second aspect of the present application, provided is use of *Akkermansia muciniphila* in the preparation of a composition for improving metabolic syndrome, wherein the composition for improving metabolic syndrome is a pharmaceutical composition or a healthcare product composition, that is, provided is use of *Akkermansia muciniphila* in the preparation of a pharmaceutical composition or a healthcare product composition for improving metabolic syndrome (including preventing and treating metabolic syndrome). The *Akkermansia muciniphila* is *Akkermansia muciniphila* AM06, *Akkermansia muciniphila* AM02, or a combination thereof, wherein the *Akkermansia muciniphila* AM06 was deposited in the China General Microbiological Culture Collection Center on Jun. 28, 2021 with a deposit number of CGMCC No. 22793; the *Akkermansia muciniphila* AM02 was deposited in the China General Microbiological Culture Collection Center on Jun. 28, 2021 with a deposit number of CGMCC No. 22794.

The inventors have found through a large number of experiments that the *Akkermansia muciniphila* AM06 and/or AM02 ("AM06 and/or AM02" herein refers to AM06, AM02, or a combination of AM06 and AM02) obtained above through separation can be used for improving metabolic syndrome, including preventing and treating (preventing and/or treating, i.e., at least one of preventing and treating) metabolic syndrome. The *Akkermansia muciniphila* AM06 and/or AM02 obtained above through separation can be used for preparing a pharmaceutical composition or preparing a healthcare product composition, and further can be used for preparing a medication or healthcare food. The *Akkermansia muciniphila* AM06 and/or AM02 obtained above through separation can reduce the obesity degree and insulin resistance of rats, regulate blood pressure, and improve the metabolism of blood sugar and blood fat, effectively preventing and treating metabolic syndrome. *Akkermansia muciniphila* AM06 and/or AM02 are thus presumed as promoters of organism metabolism.

In some embodiments, the *Akkermansia muciniphila* AM06 and the *Akkermansia muciniphila* AM02 are each independently live bacteria, inactivated bacteria with a complete morphological structure, inactivated bacteria, or a combination thereof.

As defined above, the expression "improving metabolic syndrome" refers to providing a physiologically and/or pharmacologically beneficial effect on metabolic syndrome. The "improving metabolic syndrome" includes, but is not limited to, preventing and/or treating metabolic syndrome, i.e., improving metabolic syndrome includes at least one of preventing and treating metabolic syndrome.

In some embodiments, the composition for improving metabolic syndrome is a pharmaceutical composition. Further, the pharmaceutical composition comprises the *Akkermansia muciniphila* and a pharmaceutically acceptable carrier.

In some embodiments, the pharmaceutical composition is a medication or a pharmaceutical formulation. The dosage form of the medication or the pharmaceutical formulation may be, but is not limited to, a tablet, a capsule, a granule, a pill, an ointment, a solution, a suspension, an emulsion, a cream, a spray, a drop, a patch, or a tube feed formulation. Without limitation, the medication or the medicament may be suitable for use in humans or other mammals.

In some embodiments, the composition for improving metabolic syndrome is a healthcare product composition. Further, the healthcare product composition includes the *Akkermansia muciniphila* and edible raw and auxiliary materials.

In some embodiments, the healthcare product composition is a healthcare food. The dosage form of the healthcare food may be, but is not limited to, a pill, a tablet, a granule, a capsule, a solution, a suspension, or an emulsion. Without limitation, the healthcare food may include one or more of milk powder, cheese, curd, yogurt, ice cream, and fermented cereals, or the healthcare food may be an animal food.

For Preparing Pharmaceutical Composition

In the present application, "preventing and treating", "preventing and/or treating", "prevention and treatment" and "prevention and/or treatment" have the same meaning and are used interchangeably. In the present application, "prevention and treatment" includes prevention, treatment (including adjuvant therapy), and the like. As used herein, "prevention and treatment" refers to the alleviation, delayed progression, attenuation, prevention, or maintenance of an existing disease or disorder. The "prevention and treatment" also includes the curing, prevention of development, or alleviation to some extent of one or more symptoms of a disease or disorder.

As used herein, "treatment" refers to the alleviation, delayed progression, attenuation, or maintenance of an existing disease or disorder, and the treatment also includes the curing, prevention of development, or alleviation to some extent of one or more symptoms of a disease or disorder. In the present application, "prevention and/or treatment" may also be described as at least one of prevention and treatment.

In the present application, "composition" may be a combination of a plurality of substances, and further may be used in combination or may be a mixture of a combination.

In the present application, "medicament" includes any agent, compound, composition or mixture that provides a pharmacological effect in vivo or in vitro, and often provides a beneficial effect. The range of pharmacological effects produced by the "medicament" in vivo is not particularly limited, and the medicament may be systemically effective or locally effective. The activity of the "medicament" is not particularly limited, and the medicament may be an active substance that can interact with other substances or an inert substance that does not interact with other substances.

In the present application, the "pharmaceutical composition" refers to a composition that has an effect of preventing and treating a disease or a disorder, and can be used as a medication or for preparing a medication.

In the present application, "medication" refers to a pharmaceutical formulation that can be directly administered, which generally has prescribed usage and amount.

In some embodiments, after administration of *Akkermansia muciniphila* AM06 or *Akkermansia muciniphila* AM02 to a subject (e.g., a human, a rat, and a mouse), there is an improvement in one or more of the following: body mass, Lee's index, fasting blood glucose (FBG), serum insulin (Fins), insulin resistance index (HOMA-IR), tail artery systolic blood pressure, and serum lipid index (including TC, TG, LDL-c, and HDL-c); reference may be made to Example 6. In some embodiments, the Lee's index is decreased. In some embodiments, the HOMA-IRs of the rats are all down-regulated. In some embodiments, the blood pressure is all down-regulated. In some embodiments, the serum levels of TC, TG, and LDL-c are all decreased. In some embodiments, the serum HDL-c levels are all increased.

In some embodiments, the pharmaceutical composition comprises the *Akkermansia muciniphila* (AM06 and/or AM02) described herein and a pharmaceutically acceptable carrier.

In the present application, "pharmaceutically acceptable" refers to any one or any suitable combination of those ligands, materials, compositions, and dosage forms that are suitable, within the scope of sound medical judgment, for administration to a patient and are commensurate with a reasonable benefit/risk ratio.

In the present application, "pharmaceutically acceptable carrier" refers to a pharmaceutically acceptable material, composition, or vehicle, such as a liquid or solid filler, a diluent, an excipient, a solvent, or an encapsulating material. As used herein, the phrase "pharmaceutically acceptable carrier" includes buffers, sterile water for injection, solvents, dispersion media, coatings, antibacterial and antifungal agents, isotonic agents, absorption delaying agents, and the like, that are compatible with pharmaceutical administration. Each carrier must be "pharmaceutically acceptable" in the sense of being compatible with the other ingredients of the formulation and harmless to the patient. Suitable examples include, but are not limited to: (1) sugars, such as lactose, glucose, and sucrose; (2) starches, such as corn starch, potato starch, and substituted or unsubstituted β-cyclodextrin; (3) cellulose and derivatives thereof, such as sodium carboxymethylcellulose, ethylcellulose, and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil, and soybean oil; (10) diols, such as propylene glycol; (11) polyols, such as glycerol, sorbitol, mannitol, and polyethylene glycol; (12) esters, such as ethyl oleate and ethyl laurate; (13) agar; (14) buffers, such as magnesium hydroxide and aluminum hydroxide; (15) alginic acid; (16) pyrogen-free water; (17) isotonic saline; (18) Ringer's solution; (19) ethanol; (20) phosphate buffered saline; and (21) other non-toxic compatible substances used in pharmaceutical formulations.

In the present application, "carrier" includes, but is not limited to, mannitol, sorbitol, sodium metabisulfite, sodium bisulfite, sodium thiosulfate, cysteine hydrochloride, thioglycolic acid, methionine, vitamin C, disodium ethylenediaminetetraacetate (EDTA disodium salt), sodium calcium EDTA, monovalent alkali metal carbonates, acetates, phosphates or aqueous solutions thereof, hydrochloric acid, acetic acid, sulfuric acid, phosphoric acid, amino acids, sodium chloride, potassium chloride, sodium lactate, xylitol, maltose, glucose, fructose, fructo-oligosaccharide, dextran, glycine, starch, sucrose, dextrin (e.g., maltodextrin), lactose, mannitol, silicon derivatives, cellulose and derivatives thereof, alginates, gelatin, polyvinylpyrrolidone, glycerol, Tween 80, agar, calcium carbonate, calcium bicarbonate, surfactants, polyethylene glycol, cyclodextrin, phospholipid materials, kaolin, talc, calcium stearate, and magnesium stearate.

In some embodiments, the pharmaceutical composition may also include other pharmaceutically active ingredients. The "other pharmaceutically active ingredients" may be pharmaceutical ingredients with the effect of preventing and treating metabolic syndrome, and may also be pharmaceutical ingredients with the effect of preventing and treating other diseases.

In some embodiments, the other pharmaceutically active ingredients may be suitably selected from existing medicaments for preventing and treating metabolic syndrome.

For Preparing Healthcare Product Composition

In the present application, "healthcare product" and "healthcare food" have the same meaning and are used interchangeably. In the present application, "healthcare product" refers to food having healthcare function, which can regulate physiological functions of animal body (human or other animals) and often provides a beneficial effect. The range of beneficial effects produced by the "healthcare product" in vivo is not particularly limited, and the healthcare product may be systemically effective or locally effective.

In the present application, "healthcare product composition" refers to a food composition having healthcare function. The healthcare product composition may be directly eaten as a healthcare product, and may also be eaten as a dietary additive.

In the present application, "food" refers to a directly edible product. "Food composition" refers to a composition consisting of edible substances. It will be appreciated that the food composition of the present application may include any suitable other edible material in addition to the aforementioned *Akkermansia muciniphila*. In some embodiments, the other edible substances may be selected from substances permitted to be added in food management regulations, and further, not include substances prohibited from being added in food management regulations. Unless otherwise specified, the food management regulations refer to the current standard in production.

In the present application, the definition of "improving metabolic syndrome" in "healthcare product composition for improving metabolic syndrome" is consistent with that described above.

In some embodiments, the healthcare product composition includes the *Akkermansia muciniphila* described herein and edible raw and auxiliary materials.

In the present application, "edible raw and auxiliary materials" refers to edible raw material, edible auxiliary material, or a combination thereof "Edible raw material" refers to edible substances capable of providing healthcare function alone, but not AM06 and AM02; "edible auxiliary material" refers to edible substances that do not provide healthcare function alone. It will be appreciated that "edible raw and auxiliary materials" may be selected from substances permitted to be added in healthcare product management regulations, and further, not include substances prohibited from being added in healthcare product management regulations. Unless otherwise specified, the healthcare product management regulations refer to the current standard in production.

In some embodiments, the food composition includes the *Akkermansia muciniphila* described herein (AM06 and/or AM02) and an edible auxiliary material. In the present application, a food additive also belongs to edible auxiliary materials. Examples of edible auxiliary materials include sugar, fructose, honey, glucose, starch, vitamins, beneficial trace elements and medium elements (such as calcium powder), soybean powder, mung bean powder, maltodextrin, milk powder, vegetable juice, fruit juice, spice, essence, etc. The edible auxiliary material of the present application may be used singly or in combination.

In some embodiments, the healthcare product composition consists of the *Akkermansia muciniphila* described herein (AM06 and/or AM02) and an edible auxiliary material.

In some embodiments, the healthcare product composition may further comprise other healthcare ingredients different from AM06 and AM02, and the healthcare function thereof may be improving metabolic syndrome beneficially, and may also be other healthcare functions.

In some embodiments, the healthcare product composition further comprises other probiotics.

The other probiotics may be selected from engineered bacteria of the *Akkermansia muciniphila* described herein (AM06 and/or AM02) and probiotics of other species. Probiotics of other species may include one or more of *Bacteroides fragilis, Saccharomyces boulardii, Christensenella minuta, Enterococcus hirae, Lactobacillus casei, Lactobacillus rhamnosus, Lactobacillus gasseri, Lactobacillus plantarum, Lactobacillus curvatus, Bifidobacterium infantis, Bifidobacterium longum, Bifidobacterium breve*, and the like.

In some embodiments, the healthcare product composition further comprises probiotics of other species.

Type of Formulation

In some embodiments, the pharmaceutical composition is a medication or a pharmaceutical formulation.

In the present application, "medication" refers to a pharmaceutical formulation that can be directly administered, which generally has prescribed usage and amount and is consistent with the aforementioned definition.

In some embodiments, "pharmaceutical formulation" may be a liquid formulation or a solid formulation. Liquid formulation refers to a formulation containing a liquid phase, such as, by way of non-limiting examples, a solution, a suspension, an emulsion, and the like. Non-limiting examples of solid formulations are a tablet, a capsule, a granule, a pill, and the like.

In some embodiments, the pharmaceutical formulation may be an oral formulation, an injection, a drop, a patch, a tube feed formulation, etc., depending on the mode of administration.

In some embodiments, the dosage form of the medication or the pharmaceutical formulation is a tablet, a capsule, a granule, a pill, an ointment, a solution, a suspension, an emulsion, a cream, a spray, a drop, a patch, or a tube feed formulation.

It will be appreciated that the medication comprises a therapeutically effective amount of the *Akkermansia muciniphila* described herein (AM06 and/or AM02). A therapeutically effective amount may be achieved by single or multiple dose administration. In the case of a tablet, a "dose" may comprise one or more tablets.

In the present application, "therapeutically effective amount" refers to the amount of a pharmaceutically active ingredient that will elicit the biological or medical response of an individual with respect to at least one of the disease, disorder, and associated symptom, e.g., the amount of *Akkermansia muciniphila* of the present application that will elicit a pharmacologically positive effect on an individual. The pharmacologically positive effect includes but is not limited to reducing or inhibiting enzyme or protein activity or improving the symptom, alleviating the disorder, slowing or delaying the progression of the disease, or preventing the disease, etc.

In some embodiments, the healthcare product composition is a healthcare food.

In some embodiments, the dosage form of the healthcare food is a pill, a tablet, a granule, a capsule, a solution, a suspension, or an emulsion. Further, non-limiting examples are, for example, a honeyed pill, a water-honeyed pill, a water-bindered pill, a syrup, and the like.

It will be appreciated that the healthcare food comprises a healthcare effective amount of the *Akkermansia muciniphila* described herein (AM06 and/or AM02). The "healthcare effective amount" herein refers to an amount that beneficially ameliorates metabolic syndrome, and that exerts a beneficial effect at normal dietary doses of a healthcare food.

In the present application, "subject" refers to a patient who takes a pharmaceutical composition or a consumer who consumes a healthcare product composition.

In the present application, "subject" is an animal, which may preferably be a mammal, and further may preferably be a human. A subject includes, but is not limited to, consumers of healthcare products and patients with at least one of a disease, a disorder and an associated symptom. The subject of the present application is preferably a mammal. The term "mammal" refers primarily to warm-blooded vertebrate mammals, including but not limited to: for example, cats, dogs, rabbits, bears, foxes, wolves, monkeys, deers, murine (e.g., rats and mice), pigs, cattle, sheep, horses, humans, etc. Primates may be preferred, and humans may be further preferred.

In some embodiments, the subject is a mammal.

In some embodiments, the subject is a human or another mammal. When the subject is another mammal, the medication may also be referred to as an "animal medication", and the healthcare food may be referred to as an "animal food" (e.g., animal feed).

In some embodiments, the pharmaceutical composition and the healthcare product composition are each independently suitable for use in humans or other mammals. In the present application, "another mammal" is not a human, and non-limiting examples of "another mammal" are cats, dogs, rabbits, bears, foxes, wolves, monkeys, deers, murine (e.g., rats and mice), pigs, cattle, sheep, horses, etc., further such as mice or rats; non-limiting examples of "another mammal" are also primates.

In some embodiments, the subject is a human or a rat.

In the present application, "patient" refers to an animal, which may preferably be a mammal, such as a human, and further such as a rat.

Difference in subjects may lead to different ranges of choice for other ingredients in the aforementioned pharmaceutical composition or healthcare product composition.

Third Aspect of the Present Application

In a third aspect of the present application, provided is use of a composition comprising *Akkermansia muciniphila* for improving metabolic syndrome, wherein the *Akkermansia muciniphila* is as defined above, may be as defined in the second aspect of the present application, and may further be as defined below.

As described above, the composition comprising *Akkermansia muciniphila* may be a pharmaceutical composition or a healthcare product composition.

In some embodiments, the composition comprising *Akkermansia muciniphila* is a pharmaceutical composition. Further, the pharmaceutical composition comprises the *Akkermansia muciniphila* and a pharmaceutically acceptable carrier. Without limitation, the pharmaceutical composition may be a medication or a pharmaceutical formulation. The dosage form of the medication or the pharmaceutical formulation may be, but is not limited to, a tablet, a capsule, a granule, a pill, an ointment, a solution, a suspension, an emulsion, a cream, a spray, a drop, a patch, or a tube feed formulation. The medication or the medicament may be suitable for use in humans or other mammals.

In some embodiments, the composition comprising *Akkermansia muciniphila* is a healthcare product composition. Further, the healthcare product composition comprises the *Akkermansia muciniphila* and edible raw and auxiliary materials. Without limitation, the healthcare product composition is a healthcare food. The dosage form of the healthcare food may be, but is not limited to, a pill, a tablet, a granule, a capsule, a solution, a suspension, or an emulsion. The healthcare food may include, but is not limited to, one or more of milk powder, cheese, curd, yogurt, ice cream, and fermented cereals, or the healthcare food may be an animal food.

Fourth Aspect of the Present Application

In a fourth aspect of the present application, provided is use of a composition comprising *Akkermansia muciniphila* in the preparation of or as a medication or a pharmaceutical formulation for preventing or treating metabolic syndrome or in the preparation of or as a healthcare food for improving metabolic syndrome. The *Akkermansia muciniphila* may be as defined above.

Further, the *Akkermansia muciniphila* described herein is *Akkermansia muciniphila* AM06 (with a deposit number of CGMCC No. 22793), *Akkermansia muciniphila* AM02 (with a deposit number of CGMCC No. 22794), or a combination thereof.

In some embodiments, the composition comprising *Akkermansia muciniphila* is a pharmaceutical composition or a healthcare product composition.

In the fourth aspect of the present application, "composition", "prevention and treatment", "metabolic syndrome", "improvement of metabolic syndrome", "prevention and treatment of metabolic syndrome", "pharmaceutical composition", "healthcare product composition", "medication", "pharmaceutical formulation", and "healthcare food" may be as defined above in the present application (not limited to the second aspect). The "medication", "pharmaceutical formulation", and "healthcare food" may also be as defined in the eighth aspect of the present application.

In some embodiments, provided is use of a composition comprising *Akkermansia muciniphila* in the preparation of or as a medication or a pharmaceutical formulation for preventing or treating metabolic syndrome, wherein the *Akkermansia muciniphila* is defined in accordance with the above.

In some embodiments, the composition comprising *Akkermansia muciniphila* is a pharmaceutical composition. Further, the pharmaceutical composition comprises the *Akkermansia muciniphila* and a pharmaceutically acceptable carrier. The dosage form of the medication or the pharmaceutical formulation may be, but is not limited to, a tablet, a capsule, a granule, a pill, an ointment, a solution, a suspension, an emulsion, a cream, a spray, a drop, a patch, or a tube feed formulation. The medication or the pharmaceutical formulation may be suitable for use in humans or other mammals.

In some other embodiments, provided is use of a composition comprising *Akkermansia muciniphila* in the preparation of or as a healthcare food for improving metabolic syndrome, wherein the *Akkermansia muciniphila* is defined in accordance with the above.

In some embodiments, the composition comprising *Akkermansia muciniphila* is a healthcare product composition. Further, the healthcare product composition comprises the *Akkermansia muciniphila* and edible raw and auxiliary materials. The dosage form of the healthcare food may be, but is not limited to, a pill, a tablet, a granule, a capsule, a solution, a suspension, or an emulsion.

In some embodiments, the healthcare food includes one or more of milk powder, cheese, curd, yogurt, ice cream, and fermented cereals.

In some embodiments, the healthcare food is milk powder, cheese, curd, yogurt, ice cream, or fermented cereals, or is an animal food.

The *Akkermansia muciniphila* described herein may be a live bacterium, may be an inactivated *Akkermansia muciniphila* (i.e., an inactivated bacterium, which may be wholly or partially inactivated), and may also be a lysate of a bacterial cell, a culture (e.g., a supernatant), or a component extracted from the above culture.

In some embodiments, the composition comprising *Akkermansia muciniphila* also comprises a second active ingredient.

In the present application, "second active ingredient" refers to an active ingredient having a metabolic syndrome-improving effect other than the *Akkermansia muciniphila* described herein (AM06 and/or AM02).

In some embodiments, the second active ingredient may be engineered bacteria of the *Akkermansia muciniphila* described herein (AM06 and/or AM02). The engineering means includes, but is not limited to, gene editing, chemical treatment, physical treatment, and the like. The engineered *Akkermansia muciniphila* forms a new strain different from AM06 and AM02. The engineered bacteria may still have an alcohol metabolic syndrome-improving effect, and may be imparted with at least one of other new pharmacological or physiological functions.

In some embodiments, "the engineered bacteria of the *Akkermansia muciniphila* described herein" may be a live bacterium, may be an inactivated *Akkermansia muciniphila* (i.e., an inactivated bacterium, which may be wholly or partially inactivated), and may also be a lysate of a bacterial cell, a culture (e.g., a supernatant), or a component extracted from the above culture.

In some embodiments, based on any suitable embodiment of the present application (including any suitable embodiment of the third, fourth, sixth, seventh, or eighth aspects), the composition comprising *Akkermansia muciniphila* is a composite probiotic, and in this case, in addition to the *Akkermansia muciniphila* described herein (AM06 and/or AM02), the composition also comprises other probiotics different from the *Akkermansia muciniphila* described herein.

In the present application, the "composite probiotic" comprises at least two types of probiotics. It should be understood that "composite probiotic comprising *Akkermansia muciniphila*" includes the *Akkermansia muciniphila* described herein and also includes other probiotics different from the *Akkermansia muciniphila* described herein.

In some embodiments, other probiotics (different from the *Akkermansia muciniphila* described herein) may include the engineered bacteria of the *Akkermansia muciniphila* described herein and probiotics of other species. The probiotics of other species are probiotics different from the *Akkermansia muciniphila*, including one or more of *Saccharomyces* spp., *Lactobacillus* spp., and probiotics or microorganisms of the normal flora of the human intestinal tract. The probiotic of the *Saccharomyces* spp. may include one or more of *Saccharomyces boulardii* and *Saccharomyces cerevisiae*.

In some embodiments, the probiotic different from the *Akkermansia muciniphila* may be selected from one or more of *Lactobacillus*, *Bifidobacterium*, *Bacteroides fragilis*, *Christensenella minuta*, *Enterococcus hirae*, and *Saccharomyces boulardii*.

In some embodiments, the probiotic different from the *Akkermansia muciniphila* may be selected from one or more of *Bacteroides fragilis*, *Saccharomyces boulardii*, *Christensenella minuta*, *Enterococcus hirae*, *Lactobacillus casei*, *Lactobacillus rhamnosus*, *Lactobacillus gasseri*, *Lactobacillus plantarum* (such as *Lactobacillus plantarum* KY1032), *Lactobacillus curvatus* (such as *Lactobacillus curvatus* HY7601), *Bifidobacterium infantis*, *Bifidobacterium longum*, and *Bifidobacterium breve*.

It has been reported that in most human and animal studies, certain strains of *Lactobacillus* and *Bifidobacterium* show consistent anti-obesity properties, including *Lactobacillus casei*, *Lactobacillus rhamnosus*, *Lactobacillus gasseri*, *Lactobacillus plantarum*, *Bifidobacterium infantis*, *Bifidobacterium longum*, and *Bifidobacterium breve*. It has also been reported that *Lactobacillus rhamnosus*, which produces conjugated linoleic acid (CLA), has an anti-obesity effect. The strain significantly reduced body weight and white adipose tissues in mice without altering energy intake during an 8-week probiotic feeding study. It has also been reported that mice treated with probiotics consisting of *Lactobacillus curvatus* HY7601 and *Lactobacillus plantarum* KY1032 show body weight gain and reduced fat accumulation, as well as reduced plasma insulin, leptin, total cholesterol, and hepatotoxicity biomarkers; in this study, the researchers also observed up-regulation of genes associated with fatty acid oxidation in the liver of the mice receiving probiotic treatment, and down-regulation of pro-inflammatory genes in adipose tissues.

In some embodiments, the composite probiotic comprises a plurality of *Akkermansia muciniphila*.

In some embodiments, the composite probiotic is composed of at least one of *Akkermansia muciniphila* AM06 and AM02, and at least one of engineered bacteria of AM06 and engineered bacteria of AM02.

In some embodiments, the composite probiotic comprises the *Akkermansia muciniphila* described herein, and also comprises probiotics of other species. The probiotics of other species are as defined above. Engineered bacteria of the *Akkermansia muciniphila* described herein are further included.

The composition comprising *Akkermansia muciniphila* is a pharmaceutical composition when it is used for preparing a medication or a pharmaceutical formulation, and the pharmaceutically active ingredient therein comprises at least one of *Akkermansia muciniphila* AM06 and *Akkermansia muciniphila* AM02.

The second active ingredient may be a medicament different from the *Akkermansia muciniphila*.

The medicament includes a therapeutic medicament for reducing body weight, reducing insulin resistance, well controlling blood glucose, improving lipid metabolism disorder, controlling blood pressure, and the like.

In some embodiments, based on any suitable embodiment of the present application (including any suitable embodiment of the third, fourth, sixth, seventh, or eighth aspects), the composition comprising *Akkermansia muciniphila* also comprises a second pharmaceutically active ingredient.

In some embodiments, the second pharmaceutically active ingredient includes, but is not limited to, one or more of orlistat, metformin, thiazolidinedione, fibrates (e.g., one or more of fenofibrate, bezafibrate, gemfibrozil, and the like), statins (e.g., one or more of atorvastatin, lovastatin, simvastatin, pravastatin, fluvastatin, and the like), calcium ion antagonists, and the like.

In the present application, "second pharmaceutically active ingredient" refers to a pharmaceutically active ingredient having an effect of preventing and treating metabolic syndrome other than the *Akkermansia muciniphila* described herein (AM06 and/or AM02).

In some embodiments, the composition comprising *Akkermansia muciniphila* also comprises a second pharmaceutically active ingredient.

In the present application, "second pharmaceutically active ingredient" refers to a pharmaceutically active ingredient having an effect of preventing and treating metabolic syndrome other than the *Akkermansia muciniphila* described herein (AM06 and/or AM02). The "second pharmaceutically active ingredient" is included within the scope of the "second active ingredient".

In some embodiments, the second active ingredient is atorvastatin calcium.

In the present application, each component of the "composition comprising *Akkermansia muciniphila*" may appear at any suitable timing. For example, the components may be formulated into a mixture for immediate use after opening, or may be packaged separately and formulated into a mixture in use, or may be administered separately to a subject for simultaneous presentation at a localized site in the body and for a combined effect. When the "composition comprising *Akkermansia muciniphila*" also comprises other pharmaceutically active ingredients, the combination of the *Akkermansia muciniphila* described herein (AM06 and/or AM02) with other pharmaceutically active ingredients may also appear at any suitable timing; the "other pharmaceutically active ingredients" may be as defined in the second aspect of the present application. The "composition comprising *Akkermansia muciniphila*" appearing at any suitable timing is within the scope of the present application.

Fifth Aspect of the Present Application

In a fifth aspect of the present application, provided is *Akkermansia muciniphila* for improving metabolic syndrome, wherein the *Akkermansia muciniphila* is as defined above and may further be as defined below.

In some embodiments, improving metabolic syndrome includes at least one of preventing and treating metabolic syndrome.

Sixth Aspect of the Present Application

In a sixth aspect of the present application, provided is a composition for improving metabolic syndrome, wherein the composition for improving metabolic syndrome is the composition comprising *Akkermansia muciniphila* as defined above, and may further be as defined below.

In some embodiments, improving metabolic syndrome includes at least one of preventing and treating metabolic syndrome.

Seventh Aspect of the Present Application

In a seventh aspect of the present application, provided is a composition comprising *Akkermansia muciniphila*.

The "composition comprising *Akkermansia muciniphila*" may be as defined above in the present application, including but not limited to the second and fourth aspects.

In some embodiments, the composition comprising *Akkermansia muciniphila* of the present aspect comprises the *Akkermansia muciniphila* described herein and a second active ingredient. The "second active ingredient" may be as defined in the fourth aspect of the present application. In some embodiments, the second active ingredient includes one or more of orlistat, metformin, thiazolidinedione, fibrates (e.g., one or more of fenofibrate, bezafibrate, and gemfibrozil), statins (e.g., one or more of atorvastatin, lovastatin, simvastatin, pravastatin, and fluvastatin), and calcium ion antagonists.

In some embodiments, the second active ingredient comprises atorvastatin calcium. In this case, the composition comprising *Akkermansia muciniphila* comprises the *Akkermansia muciniphila* described herein and atorvastatin calcium.

In some embodiments, the second active ingredient is atorvastatin calcium.

In some embodiments, provided is a composition comprising *Akkermansia muciniphila*, which is a composite probiotic. The "composite probiotic" is consistent with the aforementioned definition. The composite probiotic comprises the *Akkermansia muciniphila* described herein and also comprises a probiotic different from the *Akkermansia muciniphila*.

In some embodiments, the probiotic different from the *Akkermansia muciniphila* includes one or more of *Bacteroides fragilis*, *Saccharomyces boulardii*, *Christensenella minuta*, *Enterococcus hirae*, *Lactobacillus casei*, *Lactobacillus rhamnosus*, *Lactobacillus gasseri*, *Lactobacillus plantarum*, *Lactobacillus curvatus*, *Bifidobacterium infantis*, *Bifidobacterium longum*, and *Bifidobacterium breve*.

In some embodiments, provided is a composition comprising *Akkermansia muciniphila*, which is a composite probiotic and further comprises a second active ingredient that is as previously defined.

Eighth Aspect of the Present Application

In an eighth aspect of the present application, provided is a method for improving metabolic syndrome. In some embodiments, provided is a method for improving metabolic syndrome, which comprises administering to a subject *Akkermansia muciniphila*, or administering to a subject a composition comprising *Akkermansia muciniphila*, or administering to a subject a medication comprising *Akkermansia muciniphila*, or administering to a subject a healthcare food comprising *Akkermansia muciniphila*, wherein the *Akkermansia muciniphila* is as defined above.

In some embodiments, the method for improving metabolic syndrome includes at least one of preventing and treating metabolic syndrome.

In some embodiments, provided is a method for improving metabolic syndrome, which comprises administering to a subject the *Akkermansia muciniphila* described herein, a composition comprising the *Akkermansia muciniphila* described herein, a medication comprising the *Akkermansia muciniphila* described herein, or a healthcare food comprising the *Akkermansia muciniphila* described herein; further, the composition comprising the *Akkermansia muciniphila* described herein may be a pharmaceutical composition or a healthcare product composition.

In the eighth aspect of the present application, further provided is a method for improving metabolic syndrome (including a method for prevention and treatment), which comprises giving a subject a therapeutically effective amount of the *Akkermansia muciniphila* described herein (i.e., administering to the subject a therapeutically effective amount of the *Akkermansia muciniphila* described herein).

In some embodiments, provided is a method for improving metabolic syndrome (including a method for prevention and treatment), which comprises administering to a subject a therapeutically effective amount of a pharmaceutical composition comprising the *Akkermansia muciniphila* described herein.

In some embodiments, provided is a method for improving metabolic syndrome (including a method for prevention and treatment), which comprises administering to a subject a therapeutically effective amount of a pharmaceutical formulation comprising the *Akkermansia muciniphila* described herein.

In some embodiments, provided is a method for improving metabolic syndrome (including a method for prevention and treatment), which comprises administering to a subject a therapeutically effective amount of a medication comprising the *Akkermansia muciniphila* described herein.

In the eighth aspect of the present application, further provided is a method for improving metabolic syndrome, which comprises administering to a subject a healthcare effective amount of the *Akkermansia muciniphila* described herein, or administering to a subject a healthcare effective amount of a healthcare product composition comprising the *Akkermansia muciniphila* described herein, or administering to a subject a healthcare therapeutically effective amount of a healthcare food comprising the *Akkermansia muciniphila* described herein.

In the eighth aspect of the present application, "*Akkermansia muciniphila*", "the *Akkermansia muciniphila* described herein", "composition", "composition comprising *Akkermansia muciniphila*", "prevention and treatment", "metabolic syndrome", "improvement of metabolic syndrome", "prevention and treatment of metabolic syndrome", "therapeutically effective amount", "healthcare effective amount", "healthcare product composition" and "healthcare food" may be as defined above, including but not limited to the second and fourth aspects.

In the eighth aspect of the present application, the *Akkermansia muciniphila* described herein may be used in combination with other pharmaceutically active ingredients for improving metabolic syndrome. The "other pharmaceutically active ingredients" may be as defined above in the present application, including but not limited to the second and fourth aspects. For example, the other pharmaceutically active ingredients may be pharmaceutical ingredients with the effect of improving metabolic syndrome, and may also be pharmaceutical ingredients with the effect of preventing and treating other diseases. In some embodiments of the present application, the other pharmaceutically active ingredients are the second active ingredient as described above.

In the present application, the *Akkermansia muciniphila* described herein, the pharmaceutical composition comprising the *Akkermansia muciniphila* described herein, the pharmaceutical formulation comprising the *Akkermansia muciniphila* described herein, and the medication comprising the *Akkermansia muciniphila* described herein are all within the scope of the "medicament" defined in the present application.

In some embodiments, the route of administration of the medication includes, but is not limited to: oral, rectal, parenteral (intravenous, intramuscular or subcutaneous) injection, topical administration, and inhalation.

In some of these embodiments, the medicament may be administered orally, by enema, or parenterally.

In some of these embodiments, the administration cycle of the medicament may be intermittent administration, periodic administration, continuous administration, or chronic administration.

Solid dosage forms for oral administration may include capsules, tablets, pills, pulvises, and granules. In these solid dosage forms, the active ingredient is mixed with at least one conventional inert excipient (or carrier), such as sodium citrate or dicalcium phosphate, or with the following ingredients: (a) fillers or extenders, such as starch, lactose, sucrose, glucose, mannitol, and silicic acid; (b) binders, such as hydroxymethyl cellulose, alginate, gelatin, polyvinylpyrrolidone, sucrose, and acacia; (c) humectants, such as glycerol; (d) disintegrants, such as agar, calcium carbonate, potato or tapioca starch, alginic acid, certain complex silicates, and sodium carbonate; (e) solution retarders, such as paraffin; (f) absorption accelerators, such as quaternary ammonium compounds; (g) wetting agents, such as cetyl alcohol and glycerol monostearate; (h) adsorbents, such as kaolin; and (i) lubricants, such as talc, calcium stearate, magnesium stearate, solid polyethylene glycol and sodium lauryl sulfate, or mixtures thereof. In the case of capsules, tablets, and pills, the dosage forms may further include buffers. Solid dosage forms such as tablets, dragees, capsules, pills and granules can be prepared using coatings and shells such as enteric coatings and other materials well known in the art. They may include opacifying agents, and the active ingredient or compound in such a composition may be released in a certain part of the digestive tract in a delayed manner. Examples of embedding components that can be used are polymeric substances and wax-based substances. If necessary, the active ingredient can also be in microcapsule form with one or more of the above-mentioned excipients.

Liquid dosage forms for oral administration include pharmaceutically acceptable emulsions, solutions, suspensions, syrups, and elixirs. In addition to the active ingredient, the liquid dosage form may include inert diluents commonly used in the art, such as water or other solvents, solubilizers and emulsifiers, for example, ethanol, isopropanol, ethyl carbonate, ethyl acetate, propylene glycol, 1,3-butanediol, dimethylformamide, and oils, especially cottonseed oil, peanut oil, corn germ oil, olive oil, castor oil and sesame oil, or mixtures of these substances.

Besides such inert diluents, the composition may further include adjuvants, such as wetting agents, emulsifiers, suspending agents, sweeteners, flavoring agents, and perfuming agents. For example, suspensions may include suspending agents, such as ethoxylated isostearyl alcohols, polyoxyethylene sorbitol and sorbitan esters, microcrystalline cellulose, aluminum methylate and agar, or mixtures of these substances.

Compositions for parenteral injection may include physiologically acceptable sterile aqueous or anhydrous solutions, dispersions, suspensions or emulsions, and sterile powders for redissolving into sterile injectable solutions or dispersions. Suitable aqueous or non-aqueous carriers, diluents, solvents, or excipients include water, ethanol, polyols, and suitable mixtures thereof.

Dosage forms for topical administration include ointments, pulvises, patches, sprays, and inhalants. The dosage form is made by mixing the active ingredient under sterile conditions with a pharmaceutically acceptable carrier and any preservatives, buffers or propellants that may be required if necessary.

The "active ingredient" in the above-mentioned pharmaceutical formulation of the present aspect refers to the ingredient capable of exerting the "medicament" effect in the pharmaceutical composition. It should be understood that the medicament of the embodiments of the present application may be formulated with various pharmaceutically acceptable auxiliary materials into suitable clinical dosage forms, including but not limited to the dosage forms described above.

Some examples are provided below.

The embodiments of the present application will be described in detail below with reference to the examples. It should be understood that these examples are only for illustrative purposes and not intended to limit the scope of the present application. The experimental procedures without conditions noted in the following examples are preferably conducted according to the guidelines given in the present application, and may be performed according to the experimental manual or routine conditions in the art, according to the conditions suggested by the manufacturer, or according to the experimental procedures known in the art.

In the examples described below, the measurement parameters related to the components of the raw materials may be slightly deviated from the weighing accuracy range, unless otherwise specified. When temperature and time parameters are related to, acceptable deviation caused by the instrument test accuracy or operational accuracy is allowed.

Example 1. Separation and Identification of *Akkermansia muciniphila*

1.1. Separation and Identification of AM02 Strain

Feces, the size of soybeans, (the sample was from a healthy adult male) was taken and placed in a 10 mL centrifuge tube using a sterile sampling spoon. After sampling, the sample was immediately transferred to a 37° C. anaerobic workstation (85% $N_2$, 10% $H_2$, and 5% $CO_2$, volume percent), and serially 10-fold diluted to $10^{-9}$. 1 mL of each dilution solution was inoculated into 9 mL of a basal medium taking mucin as a sole carbon source, and anaerobically cultured for 7 days. 1 mL of the culture solution inoculated by $10^{-4}$ dilution was diluted to $10^{-6}$ according to a 1:10 serial dilution. 100 µL of each dilution was coated on a mucin agar medium and anaerobically cultured for 7 days, and a single colony was inoculated into 2 mL of a BHI broth (a medium comprising N-acetyl-D-glucosamine). The cultured bacteria solution was subjected to 16S rRNA sequencing, and the 16S rRNA sequence was aligned on the NCBI database. The strain obtained through separation was identified as *Akkermansia muciniphila*, and the 16S rRNA sequencing results are shown below (SEQ ID No.: 1):

```
gtgacgggcggggtgcatagacatgcagtcgaacgagagaattgctagct tgctaataattctctagtggcgcacgggtgagtaacacgtgagtaacctg cccccgagagcgggatagccctgggaaactgggattaataccgcatagta tcgaaagattaaagcagcaatgcgcttggggatgggctcgcggcctatta gttagttggtgaggtaacggctcaccaaggcgatgacgggtagccggtct gagaggatgtccggccacactggaactgagacacggtccagacacctacg ggtggcagcagtcgagaatcattcacaatggggggaaaccctgatggtgcg acgccgcgtgggggaatgaaggtcttcggattgtaaaccctgtcatgtg ggagcaaattaaaaagatagtaccacaagaggaagagacggctaactctg tgccagcagccgcggtaatacagaggtctcaagcgttgttcggaatcact gggcgtaaagcgtgcgtaggctgtttcgtaagtcgtgtgtgaaaggcgcg ggctcaacccgcggacggcacatgatactgcgagactagagtaatggagg gggaaccggaattctcggtgtagcagtgaaatgcgtagatatcgagagga acactcgtggcgaaggcgggttcctggacattaactgacgctgaggcacg aaggccaggggagcgaaagggattagataccctgtagtcctggcagtaa acggtgcacgcttggtgtgcggggaatcgaccccctgcgtgccggagcta acgcgttaagcgtgccgcctggggagtacggtcgcaagattaaaactcaa agaaattgacggggacccgcacaagcggtggagtatgtggcttaattcga tgcaacgcgaagaaccttacctgggcttgacatgtaatgaacaacatgtg aaagcatgcgactcttcggaggcgttacacaggtgctgcatggccgtcg tcagctcgtgtcgtgagatgtttggttaagtccagcaacgagcgcaaccc ctgttgccagttaccagcacgtgaaggtggggactctggcgagactgccc agatcaactgggaggaaggtggggacgacgtcaggtcagtatggcccta tgcccagggctgcacacgtactacaatgcccagtacagagggggccgaag ccgcgaggcggaggaaatcctgaaaactgggcccagttcggactgtaggc tgcaacccgcctacacgaagccggaatcgctagtaatggcgcatcagcta cggcgccgtgaatacgttcccgggtcttgtacacaccgcccgtcacatca tggaagccggtcgcacccgaagtatctgaagccaaccgcaaggaggcagg tcctaaggtagactactgtctat.
```

The results of sequence alignment of the sequence with the 16S rRNA sequence of ATCC BAA-835 on NCBI showed a Per.Ident value of 99.43%.

1.2. Separation and Identification of AM06 Strain

A freshly collected breast milk sample (from a healthy adult female) was immediately injected into a 5 mL anaerobic vial for storage, and the sample was then transferred to a 37° C. anaerobic workstation (85% $N_2$, 10% $H_2$, and 5% $CO_2$, volume percent), and serially 10-fold diluted to $10^{-6}$. 1 mL of each dilution solution was inoculated into 9 mL of a basal medium taking mucin as a sole carbon source, and anaerobically cultured for about 1 month. 1 mL of the culture solution inoculated by $10^{-1}$ to $10^{-4}$ dilution was diluted to $10^{-6}$ according to a 1:10 dilution. 100 μL of each dilution was coated on a mucin agar medium and anaerobically cultured for 7 days, and a single colony was inoculated into 2 mL of a BHI broth (a medium comprising N-acetyl-D-glucosamine). The cultured bacteria solution was subjected to 16S rRNA sequencing and identification, and the 16S rRNA sequence was aligned on the NCBI database. The identification result is *Akkermansia muciniphila*, and the 16S rRNA sequencing results are shown below (SEQ ID No.: 2):

```
cggattacggcgtgctaagactgcagtcgacgagagattgctagcttgct aataattctctagtggcgcacgggtgagtaacacgtgagtaacctgcccc cgagagcgggatagccctgggaaactgggattaataccgcatagtatcga aagattaaagcagcaatgcgcttggggatgggctcgcggcctattagtta gttggtgaggtaacggctcaccaaggcgatgacgggtagccggtctgaga ggatgtccggccacactggaactgagacacggtccagacacctacgggtg gcagcagtcgagaatcattcacaatggggggaaaccctgatggtgcgacgc cgcgtgggggaatgaaggtcttcggattgtaaaccctgtcatgtgggag caaattaaaaagatagtaccacaagaggaagagacggctaactctgtgcc agcagccgcggtaatacagaggtctcaagcgttgttcggaatcactgggc gtaaagcgtgcgtaggctgtttcgtaagtcgtgtgtgaaaggcgcgggct caacccgcggacggcacatgatactgcgagactagagtaatggagggga accggaattctcggtgtagcagtgaaatgcgtagatatcgagaggaacac tcgtggcgaaggcgggttcctggacattaactgacgctgaggcacgaagg ccaggggagcgaaagggattagataccctgtagtcctggcagtaaacgg tgcacgcttggtgtgcggggaatcgaccccctgcgtgccggagctaacgc gttaagcgtgccgcctggggagtacggtcgcaagattaaaactcaaagaa attgacggggacccgcacaagcggtggagtatgtggcttaattcgatgca acgcgaagaaccttacctgggcttgacatgtaatgaacaacatgtgaaag catgcgactcttcggaggcgttacacaggtgctgcatggccgtcgtcagc tcgtgtcgtgagatgtttggttaagtccagcaacgagcgcaacccctgtt gccagttaccagcacgtgaaggtggggactctggcgagactgcccagatc aactgggaggaaggtggggacgacgtcaggtcagtatggcccttatgccc agggctgcacacgtactacaatgcccagtacagagggggccgaagccgcg aggcggaggaaatcctaaaaactgggcccagttcggactgtaggctgcaa cccgcctacacgaagccggaatcgctagtaatggcgcatcagctacggcg ccgtgaatacgttcccgggtcttgtacacaccgcccgtcacatcatggaa gccggtcgcacccgaagtcattactgaagccaaccgcaaggaggcaggtc ctaaagtgagactataacaa.
```

The results of sequence alignment of the sequence with the 16S rRNA sequence of ATCC BAA-835 on NCBI showed a Per.Ident value of 99.22%.

1.3. Information on Strain Preservation

The *Akkermansia muciniphila* AM02 was classified as *Akkermansia muciniphila*, and was deposited in the China General Microbiological Culture Collection Center (address: No. 3, Yard No. 1, West Beichen Road, Chaoyang District, Beijing) on Jun. 28, 2021 with a deposit number of CGMCC No. 22794; the strain was received and registered in the collection center on Jun. 28, 2021, and was detected as a live strain by the collection center on Jun. 28, 2021.

The *Akkermansia muciniphila* AM06 was classified as *Akkermansia muciniphila*, and was deposited in the China General Microbiological Culture Collection Center (address: No. 3, Yard No. 1, West Beichen Road, Chaoyang District, Beijing) on Jun. 28, 2021 with a deposit number of CGMCC No. 22793; the strain was received and registered in the collection center on Jun. 28, 2021, and was detected as a live strain by the collection center on Jun. 28, 2021.

Figure 2:
FIG. 2 is a picture showing the colony characteristics of the *Akkermansia muciniphila* AM06 obtained in an example of the present application.

Example 2. Culture of *Akkermansia muciniphila* and Preparation of Inactivated Bacteria 2.1. *Akkermansia muciniphila* strain was subjected to streak inoculation on a BHA plate and anaerobically cultured for 3 days. The morphological characteristics, staining characteristics, size, globular shape or rod-like shape, distribution, and the like of the colonies were observed. Colony characteristics: After the *Akkermansia muciniphila* AM02 and AM06 were cultured on the medium described above for 3 days, the colonies were opaque and white with circular protrusion, neat edges, and non-uniform size. The size of the colonies was about 0.08-2.2 mm, and the colonies can be seen in FIG. 1 (*Akkermansia muciniphila* AM02) and FIG. 2 (*Akkermansia muciniphila* AM06).

Figure 3:
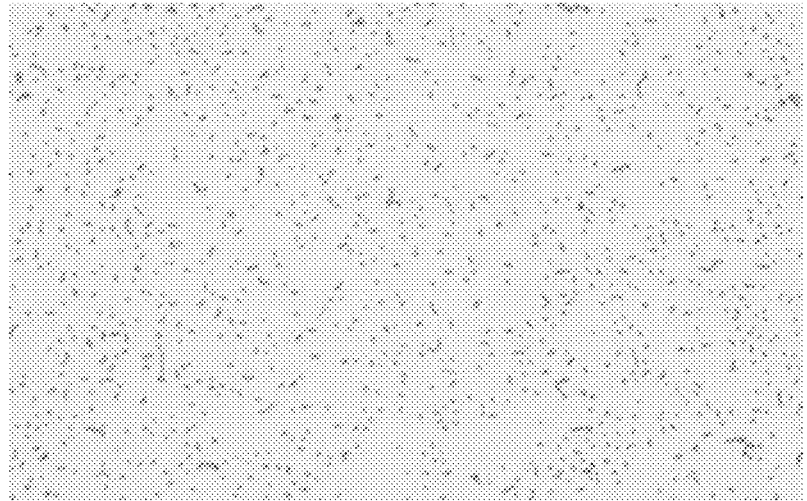
FIG. 3 is a microscopic view of the *Akkermansia muciniphila* AM02 cultured in an example of the present application after gram-staining.
Figure 4:
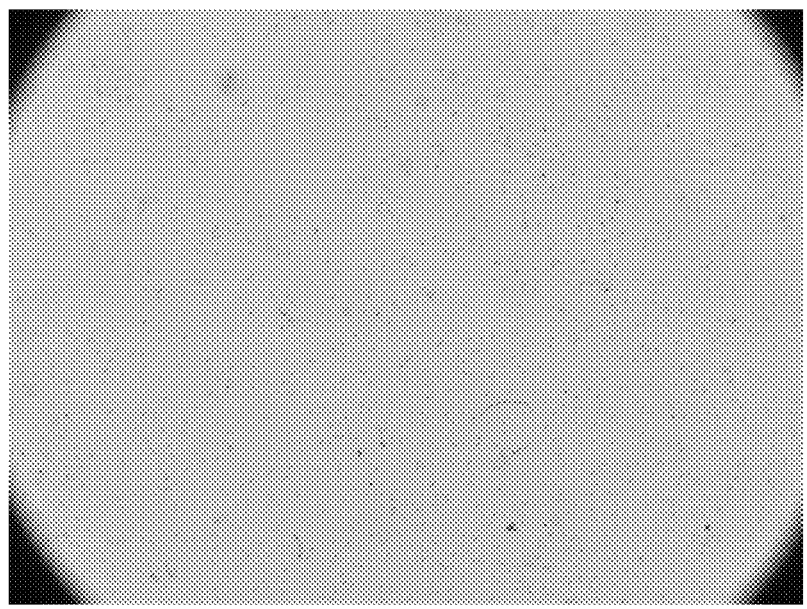
FIG. 4 is a microscopic view of the *Akkermansia muciniphila* AM06 cultured in an example of the present application after gram-staining.

Morphology under a microscope: *Akkermansia muciniphila* AM02 and AM06 were subjected to the gram-staining microscopy and were found to be gram-negative bacteria, which were oval, showed a single or chain-like arrangement, and can be seen in FIG. 3 (*Akkermansia muciniphila* AM02) and FIG. 4 (*Akkermansia muciniphila* AM06).

The colony characteristics of the standard strain ATCC BAA-835 were: circular protrusion, neat edges, opaque, white, and non-uniform size. The morphology under a microscope was gram-negative bacteria, which were oval and showed a single or chain-like arrangement. 2.2. A single colony was selected, inoculated in a BHI broth and cultured for 48 h (at the temperature of 37° C.), the resulting bacteria solution was centrifuged for precipitation at the rotating speed of 16000×g for 30 min, and the supernatant was removed and the precipitate was collected, thus obtaining the *Akkermansia muciniphila* bacterial sludge. AM02, AM06, and ATCC BAA-835 *Akkermansia muciniphila* were obtained by separate culture. 2.3. Preparation of inactivated bacteria: A proper amount of bacterial sludge was taken, a normal saline according to the ratio of bacterial sludge:normal saline (m:v)=1:10 was added, and the mixture was stirred at 1000 rpm for 5-20 min using a stirrer to uniformly disperse the bacteria. 100 mL of the dispersed bacteria solution was placed in a sterile three-necked round-bottom flask (the bacteria solution was ensured not to be adhered to the inner wall of the flask as much as possible). The three-necked round-bottom flask was placed on a heating plate of a magnetic stirrer, a sterile stirrer was placed therein, and a temperature electrode was inserted. The rotation speed was set at 300-500 rpm for heating at 70° C. for 30 min, thus obtaining the inactivated bacteria of the *Akkermansia muciniphila*.

Example 3. Non-Targeted Metabolomic Differential Analysis of *Akkermansia muciniphila* Culture Supernatant 3.1. Sample Preparation The culture supernatant of each *Akkermansia muciniphila* (AM02, AM06, and ATCC BAA-835) after culture in Example 2 was taken, and 1 mL of the bacteria solution was separately taken and centrifuged at 12000 rpm for 5 min. The supernatant was filtered through a 0.22 μm filter membrane, and the filtrate was taken as a sample to be detected for non-targeted metabolomic analysis. For each strain, 5 replicates of the test sample were prepared. 3.2. Experimental results PCA is a data dimension reduction method, namely, a plurality of variables are reduced to a group of new comprehensive variables, and then the first few main components reflecting the original variable information are selected as much as possible therefrom, so that the purpose of reducing the dimension is achieved. The PCA diagram reflects the real distribution of the samples, is mainly used for observing the separation trend among the sample groups and whether abnormal points appear or not, and reflects the variation degree among the groups and in the groups from the original data.

Figure 5:
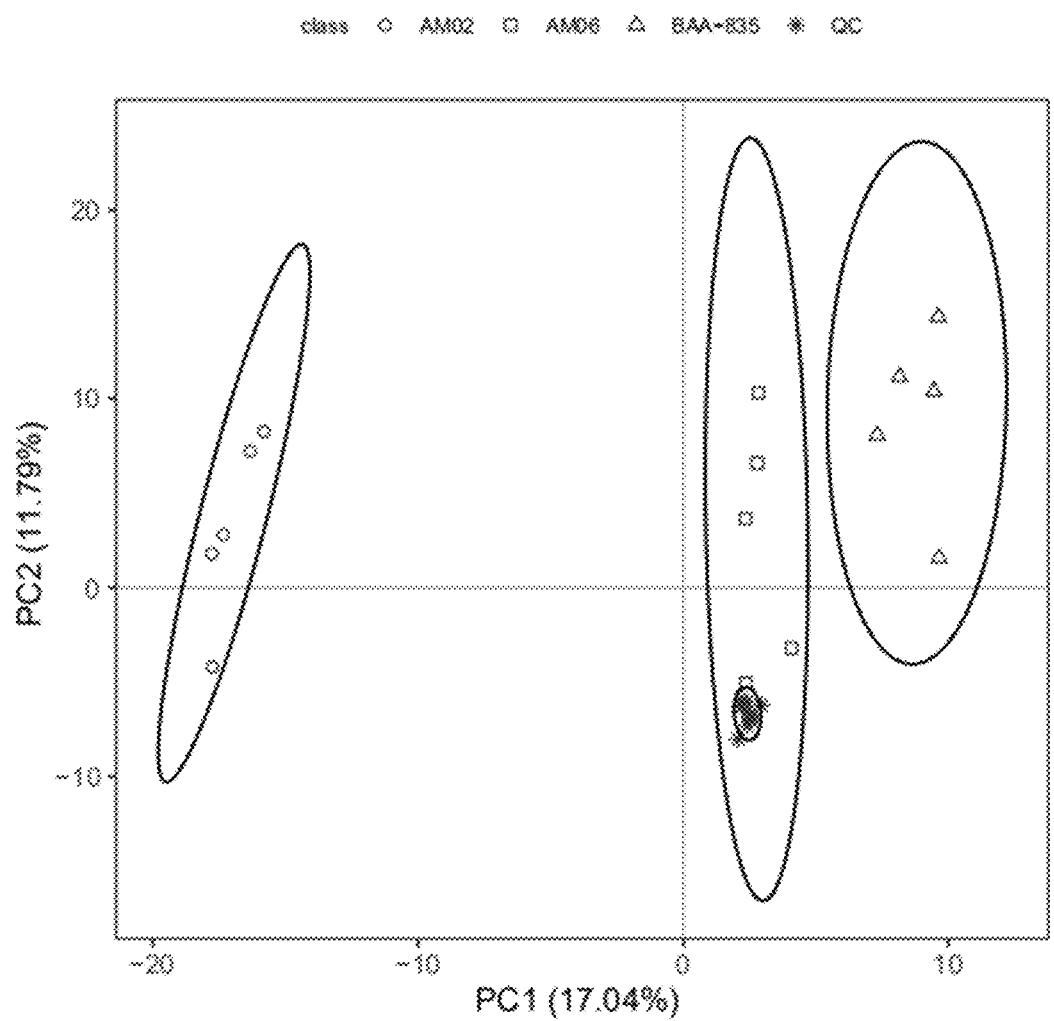
FIG. 5 is a picture showing the PCA analysis of the culture supernatant metabolite of several *Akkermansia muciniphila* according to an example of the present application.

The experimental results are shown in FIG. 5. The PCA analysis of the quality control sample (QC sample) and all samples are included in FIG. 5. Each QC sample is aggregated in the two principal component analysis diagrams, indicating that the instrument was stable during detection, and the repeatability of acquired data was good. The results also show that the metabolites in the AM06 culture supernatant were relatively close to those in the BAA-835 culture supernatant, and the AM02 culture supernatant metabolites were significantly different from those of BAA-835.

The results of comparing the amounts of the differential metabolites between the strains are shown in Table 1. It can be seen that for AM02, compared with the standard strain BAA-835, the number of differential metabolites detected by positive ion (pos) pattern and the number of differential metabolites detected by negative ion (neg) pattern are 205 and 135, respectively; for AM06, compared with the standard strain BAA-835, the number of differential metabolites detected by positive ion (pos) pattern and the number of differential metabolites detected by negative ion (neg) pattern are 111 and 62, respectively.

TABLE 1

Statistical table of differential metabolites

| Inter-group comparison | Differential metabolites detected by positive ion (pos) pattern | | | Differential metabolites detected by negative ion (neg) pattern | | |
| --- | --- | --- | --- | --- | --- | --- |
| | Total | Up-regulation number | Down-regulation number | Total | Up-regulation number | Down-regulation number |
| AM02: BAA-835 | 205 | 85 | 120 | 135 | 66 | 69 |
| AM06: BAA-835 | 111 | 20 | 91 | 62 | 14 | 48 |
| AM06: AM02 | 132 | 54 | 78 | 139 | 68 | 71 |

Example 4. Efficacy Verification of *Akkermansia muciniphila*

4.1. Tolerance of *Akkermansia muciniphila* to Artificial Gastric Juice

4.1.1. Experimental Procedure and Grouping

TABLE 2

Experimental grouping

| Group | Parallel number | Detection indexes |
|---|---|---|
| 0.9 wt % NaCl solution group | 3 | Viable count after anaerobic incubation at 37 ± 2° C. for 0 h, 1.5 h, and 3 h |
| pH 2.0 artificial gastric juice group | | |
| pH 3.0 artificial gastric juice group | | |

TABLE 3

Experimental procedure

| Group | Experimental procedure | Incubation Condition | Parallel number | Viable count (CFU/mL) 0 h | 1.5 h | 3 h |
|---|---|---|---|---|---|---|
| Bacteria + 0.9 wt % NaCl solution | 19.8 mL of 0.9 wt % NaCl solution (placed at room temperature) was separately added to 0.2 mL of the bacteria solutions of AM06, AM02, and standard strain, mixed well, and aliquoted into 5 mL/tube | 37 ± 2° C., anaerobic | 3 | + | + | + |
| Bacteria + pH 2.0 artificial gastric juice | 19.8 mL of pH 2.0 artificial gastric juice (placed at room temperature) was separately added to 0.2 mL of the bacteria solutions of AM06, AM02, and standard strain, mixed well, and aliquoted into 5 mL/tube | | | + | + | + |
| Bacteria + pH 3.0 artificial gastric juice | 19.8 mL of pH 3.0 artificial gastric juice (placed at room temperature) was separately added to 0.2 mL of the bacteria solutions of AM06, AM02, and standard strain, mixed well, and aliquoted into 5 mL/tube | | | + | + | + |

"+" indicates that detection is required.

4.1.1.1. One *Akkermansia muciniphila* strain was taken, the label was removed, the outer surface of the glycerol cryopreservation tube was wiped and disinfected by 75% (v/v) alcohol. After vortex oscillation and uniform mixing, the tube was opened. 100-500 µL of the bacteria solution was pipetted and inoculated to 10 mL/tube of BHI broth and shaken uniformly. 3 tubes were prepared in total. Simultaneously, a negative control was made by not inoculating bacteria. The tubes were placed at 37° C. for anaerobic culture for 2-4 days to give a primary seed solution.

The primary seed solution was subjected to the gram-staining microscopy, which should be G-*bacillus* and free of spores and contaminating bacteria.

4.1.1.2. 10 mL of the primary seed solution described above was taken and centrifuged at 12000×g at 4° C. for 10 min. The supernatant was discarded, and 1 mL of 0.9 wt % NaCl solution was added for resuspension to separately obtain bacteria solutions for later use.

4.1.1.3. According to Table 2 and Table 3, the bacteria solutions of AM06, AM02, and the standard strain were separately added to 0.9 wt % NaCl, artificial gastric juice at pH 3.0 and artificial gastric juice at pH 2.0, mixed well, aliquoted into 5 mL/tube, placed in an anaerobic glove box for incubation at 37° C. for 0 h, 1.5 h, and 3 h, and then taken out to detect the bacteria concentration of each sample. 3 parallel experiments were conducted for each experimental group.

4.1.1.4. Viable Count Determination:

An experimental sample was taken and serially 10-fold diluted into different dilutions. 100 µL of the diluent was taken and inoculated onto a BHA plate and uniformly coated. 2 plates were prepared for each dilution. Generally, 2-3 dilutions were prepared. Simultaneously, 100 µL of the diluent was placed on a BHA plate as a negative control. All the coated plates were rightly placed and anaerobically cultured for about 3-5 days. The growth condition of the bacterial colonies on the plates was observed, and cell counting was performed. The viable count was calculated according to the sum of colonies of 2 plates according to the following formula:

$$\text{Viable count (CFU/mL)} = \text{sum of colonies on 2 plates}/2 \times 10 \times \text{final dilution}$$

Survival Rate Calculation:

$$\text{Survival rate} = \frac{\text{Average viable count of incubation sample at each time point}}{\text{Average viable count of corresponding groups after 0.9\% NaCl incubation for 0 h}} \times 100\%$$

4.1.2. Experimental Results

The experimental results are shown in Table 4. The artificial gastric juice tolerance of different *Akkermansia muciniphila* strains was, from high to low, AM02>AM06>standard strain BAA-835 in sequence.

TABLE 4

Statistical table of results of artificial gastric juice tolerance survival rate of *Akkermansia muciniphila*

Survival rate = average viable count at each time point/ 0.9 wt % NaCl 0 h average viable count × 100%

| Group | Incubation/ h | Standard strain (ATCC BAA-835) | AM02 | AM06 |
|---|---|---|---|---|
| 0.9 wt % NaCl | 0 | 100.00% | 100.00% | 100.00% |
|  | 1.5 | 97.33% | 83.86% | 149.47% |
|  | 3 | 110.31% | 69.30% | 129.32% |
| pH 3 | 0 | 98.85% | 102.53% | 149.32% |
|  | 1.5 | 9.54% | 87.03% | 102.71% |
|  | 3 | 2.32% | 59.21% | 35.26% |
| pH 2 | 0 | 33.51% | 87.03% | 88.87% |
|  | 1.5 | 4.68% | 57.47% | 11.62% |
|  | 3 | 3.00% | 46.30% | 9.64% |

4.2. Tolerance of *Akkermansia muciniphila* to Artificial Intestinal Juice 4.2.1. Experimental Procedure and Grouping

TABLE 5

Experimental grouping

| Group | Parallel number | Detection indexes |
|---|---|---|
| ATCC BAA-835 + artificial intestinal juice group | 3 | Viable count after anaerobic incubation at 37 ± 2° C. for 0 h, 4 h, and 8 h |
| AM02 + artificial intestinal juice group |  |  |
| AM06 + artificial intestinal juice group |  |  |

4.2.1.1. Preparation of Primary Seed Solution

One *Akkermansia muciniphila* strain was taken, the label was removed, the outer surface of the glycerol cryopreservation tube was wiped and disinfected by 75% (v/v) alcohol. After vortex oscillation and uniform mixing, the tube was opened. 100 µL of the bacteria solution was pipetted and inoculated to 10 mL/tube of BHI broth and shaken uniformly. 3 tubes were prepared in total. Simultaneously, a negative control was made by not inoculating bacteria. The tubes were placed at 37° C. for anaerobic culture for 2-4 days to give a primary seed solution.

The primary seed solution was subjected to the gram-staining microscopy, which should be G-*bacillus* and free of spores and contaminating bacteria.

4.2.1.2. Preparation of Bacterial Sludge

The primary seed solution described above was separately aliquoted into 1.5 mL/tube, and centrifuged at 12000×g for 10 min. The supernatant was discarded to give the bacterial sludge. 3 tubes of bacterial sludge were separately prepared for AM06, AM02, and the standard strain.

4.2.1.3. Evaluation of Strain Artificial Intestinal Juice Tolerance

As shown in Table 5 and Table 6, 1.5 mL of artificial intestinal juice was separately added to each tube of the obtained bacterial sludge and mixed. Each tube of solution was then aliquoted into 0.5 mL/tube to give 3 tubes, which were separately anaerobically incubated at 37° C. for 0 h, 4 h and 8 h. Sampling was performed to determine the viable count. 3 parallel experiments were conducted for each group.

TABLE 6

Experimental procedure

| Experimental group | Experimental procedure | Parallel number | Incubation condition | Incubation time 0 h | 4 h | 8 h |
|---|---|---|---|---|---|---|
| ATCC BAA-835 + artificial intestinal juice | 1.5 mL of artificial intestinal juice was added to the bacterial sludge of each tube of the standard strain, mixed well, and aliquoted into 0.5 mL/tube. | 3 | 37 ± 2° C., anaerobic | + | + | + |
| AM02 + artificial intestinal juice | 1.5 mL of artificial intestinal juice was added to the bacterial sludge of each tube of AM02, mixed well, and aliquoted into 0.5 mL/tube. |  |  | + | + | + |
| AM06 + artificial intestinal juice | 1.5 mL of artificial intestinal juice was added to the bacterial sludge of each tube of AM06, mixed well, and aliquoted into 0.5 mL/tube. |  |  | + | + | + |

"+" indicates that detection is required.

4.2.1.4. Viable Count Determination

The incubated samples were separately taken and serially 10-fold diluted. 100 µL of the diluent was taken and inoculated onto a BHA plate and uniformly coated. 2 plates were prepared for each dilution. Generally, 2-3 dilutions were prepared. Simultaneously, 100 µL of the diluent was placed on a BHA plate as a negative control. All the coated plates were rightly placed and anaerobically cultured for about 3-5 days. The growth condition of the bacterial colonies on the plates was observed, and cell counting was performed.

Viable count $(CFU/\text{mL})$ = sum of colonies on 2 plates/2 × 10 × final dilution Survival Rate Calculation:

Survival rate = viable count at each time point/corresponding 0 h viable count × 100%

4.2.2. Experimental Results

The results are shown in Table 7. ATCC BAA-835, AM02, and AM06 strains had good artificial intestinal juice tolerance, and the tolerance was, from high to low, AM02>AM06>standard strain BAA-835 in sequence.

TABLE 7

Statistical table of survival rate

| Strain | Survival rate after incubation | | |
|---|---|---|---|
| | 0 h | 4 h | 8 h |
| ATCC BAA-835 | 100.00% | (82.83 ± 1.86) % | (88.75 ± 9.34) % |
| AM02 | 100.00% | (88.13 ± 5.01) % | (107.58 ± 4.83) % |
| AM06 | 100.00% | (170.17 ± 3.09) % | (191.12 ± 33.14) % |

5. Effect of *Akkermansia muciniphila* on the Expression of Caco2 Cell Tight Junction Protein ZO-1 Induced by TNF-α and IFN-γ

5.1. Experimental Procedure and Grouping

Caco2 cells were inoculated into a 96-well plate and cultured until the confluency was 80%-90%. The Caco2 cells were induced by using 100 ng/mL TNF-α+100 ng/mL IFN-γ for 24 h. AM02, AM06, and BAA-835 were then separately added and incubated with the cells for 24 h. The experimental groups may be seen in Table 8, and 5 duplicate wells were set for each group. The effect of BAA-835, AM06, and AM02 on the expression of Caco2 cell tight junction protein ZO-1 induced by TNF-α and IFN-γ was observed using immunofluorescence.

TABLE 8

Experimental grouping

| | | Treatment | |
|---|---|---|---|
| No. | Group | Induction stage | Intervention stage |
| A | Blank control group | Medium | Medium |
| B | Inflammation model group | 100 ng/ml TNF-α + | 100 ng/ml TNF-α + 100 ng/mL IFN-γ, incubation for another 24 h |
| C | AM02 group | 100 ng/ml IFN-γ, incubation for 24 h | 1 × 10$^8$ CFU/mL AM02 + 100 ng/ml TNF-α + 100 ng/mL IFN-γ, incubation for 24 h |
| D | AM06 group | | 1 × 10$^8$ CFU/mL AM06 + 100 ng/ml TNF-α + 100 ng/mL IFN-γ, incubation for 24 h |
| E | BAA-835 group | | 1 × 10$^8$ CFU/mL BAA-835 + 100 ng/ml TNF-α + 100 ng/mL IFN-γ, incubation for 24 h |

5.2. Experimental Results

Figure 6:
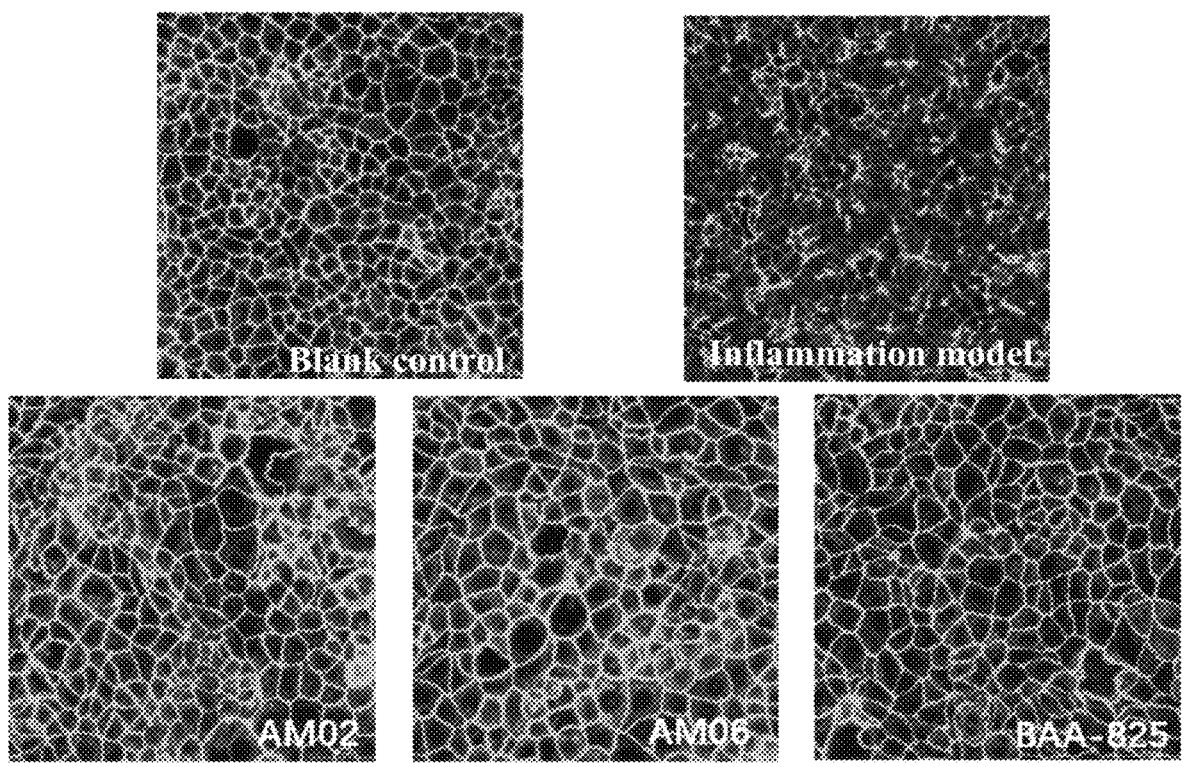
FIG. 6 is a fluorescent microscopic photograph showing the effect of several *Akkermansia muciniphila* on the reduction of the expression of Caco2 cell tight junction protein ZO-1 induced by TNF-α and IFN-γ in an example of the present application.

The statistical results of the fluorescence intensity of the pictures taken are shown in FIG. 6 and Table 9. Compared with the blank control group, the fluorescence intensity of the intercellular space of the inflammation model group was significantly weakened after induced by TNF-α and IFN-γ for 48 h, which indicates that the expression of ZO-1 protein was reduced and the tight connection between cells was damaged. Compared with the inflammation model group, the fluorescence intensity of the treated group of cells after AM02, AM06, and BAA-835 intervention was significantly increased (p<0.05), and the capacity of AM02 and AM06 for inhibiting inflammatory factors to induce reduction of ZO-1 protein of Caco2 cells was significantly better than that of BAA-825 (p<0.05).

TABLE 9

Fluorescence intensity statistics

| No. | Group | Fluorescence intensity |
|---|---|---|
| A | Blank control group | 36.2647 ± 5.8977** |
| B | Inflammation model group | 25.6588 ± 4.5303 |
| C | AM02 group | 41.7059 ± 6.5664** aa |
| D | AM06 group | 40.2949 ± 4.5437** aa |
| E | BAA-835 group | 33.6688 ± 4.13336** |

Note:
**indicates significant difference p < 0.01 compared with the model group;
aa indicates significant difference p < 0.01 compared with the BAA-835 group.

Example 6. Efficacy Experiment of *Akkermansia muciniphila* on Treatment of Metabolic Syndrome 6.1. Experimental Design and Procedure One hundred SPF-grade male SD rats with weight of 160-180 g were subjected to adaptive feeding for 1 week, and 80 rats were randomly selected and fed with a high-fat and high-sugar feed for 8 weeks to perform metabolic syndrome modeling. The formula of the high-fat and high-sugar feed (in percentage by mass, wt %) were: 66.5% of basal feed, 2.5% of cholesterol, 20% of sucrose, 10% of lard, and 1% of cholate. The remaining 20 rats were fed with a basal feed.

After 8 weeks of feeding, 70 rats that were successfully modeled were selected according to the levels of body weight, body length, blood pressure, blood fat, fasting blood glucose, and the like, and randomly divided into 8 groups, with 10 rats in each group: model group, positive drug group (atorvastatin calcium, Pfizer Inc., 15 mg/kg), AKK bacteria AM06 live bacteria low dose group (10$^6$ CFU/rat), high dose group (10$^{10}$ CFU/rat), AM02 live bacteria group (10$^{10}$ CFU/rat), AM02 live bacteria (10$^{10}$ CFU/rat) in combination with atorvastatin calcium (15 mg/kg) group, and AKK bacteria AM06 and AM02 inactivated bacteria groups (10$^{10}$ cells/rat). Another 10 unmodeled rats were used as a normal control group.

Administration was performed after the grouping (DO): For the normal control group and the model group, 1 mL of normal saline was administered by intragastric administration once daily; for each of the treatment groups, the corresponding dose of the medicament was administered by intragastric administration once daily for consecutively 8 weeks. During the grouping and administration, the normal control group was fed with a basal feed, and the model group and each treatment group were fed with a high-fat and high-sugar feed.

After the last intragastric administration, the body length and the body weight of the rats were recorded. The Lee's index was calculated by the following formula: Lee's index=body weight (g)$^{1/3}$×1000×body length (cm)$^{-1}$; after the last intragastric administration, the rats were fasted but had free access to water for 12 h, the tail artery systolic blood pressure (SBP) was measured by a non-invasive blood pressure instrument, and the fasting blood glucose level (FBG) was detected by a glucometer; the rats were anesthetized with chloral hydrate, blood was collected from the abdominal aorta, the serum was separated, the serum insulin level (Fins) was measured by ELISA, and the insulin resistance index (HOMA-IR) was calculated as: HOMA-IR=FBG×Fins/22.5; serum triglyceride (TG), Total cholesterol (TC), low density lipoprotein (LDL-c), and high density lipoprotein (HDL-c) were measured by an automatic biochemical analyzer. All data were statistically analyzed using SPSS 25.0.p<0.05 was considered to have a statistical difference.

6.2. Experimental Results 6.2.1. Body Mass and Lee's Index

The results are shown in Table 10.

TABLE 10

Lee's index and body mass (mean ± SD) for each group of rats

| Group | Body mass (g) | Lee's index |
|---|---|---|
| Normal control | 427.76 ± 63.14* | 250.74 ± 55.84* |
| Model | 675.67 ± 55.48 | 366.29 ± 59.98 |
| Positive drug | 460.15 ± 74.62* | 273.82 ± 78.48* |
| Low dose of AM06 live bacteria | 479.45 ± 43.24* | 305.63 ± 61.24* |
| High dose of AM06 live bacteria | 471.87 ± 63.30* | 293.04 ± 69.67* |
| AM02 live bacteria | 489.17 ± 61.60* | 310.80 ± 61.94 |
| AM06 live bacteria ± atorvastatin calcium | 430.23 ± 64.79* | 239.83 ± 72.21* |
| AM06 inactivated bacteria | 487.28 ± 55.74* | 298.30 ± 72.17* |
| AM02 inactivated bacteria | 500.37 ± 55.53* | 320.97 ± 53.98 |

Note:
*indicates significant difference p < 0.05, compared with the model group.

The Lee's index is an effective index in evaluating the degree of obesity in adult rats. The Lee's index of the adult obese rats is significantly increased compared with that of the normal rats.

As shown in Table 10, the body weight and Lee's index of the rats in the model group were significantly increased compared with the normal control group, indicating successful modeling.

Compared with the model group, the body mass of each treatment group was significantly decreased.

Compared with the model group, the Lee's index of each treatment group was decreased, wherein the positive drug and each AKK bacteria AM06 group had significant difference. This indicates that AKK bacteria can effectively control the weight of rats and reduce obesity symptoms.

6.2.2. Fasting Blood Glucose, Serum Insulin, and Insulin Resistance Indexes

TABLE 11

Fasting blood glucose, serum insulin, and insulin resistance indexes (mean ± SD) for each group of rats

| Group | FBG (mmol/L) | Fins (mIU/L) | HOMA-IR |
|---|---|---|---|
| Normal control | 5.10 ± 1.05* | 11.85 ± 3.36* | 2.88 ± 0.58** |
| Model | 9.37 ± 0.94 | 21.81 ± 2.92 | 8.73 ± 1.17 |
| Positive drug | 6.40 ± 1.08 | 14.22 ± 3.10* | 3.02 ± 1.25** |
| Low dose of AM06 live bacteria | 6.70 ± 1.69 | 16.45 ± 2.89 | 3.50 ± 1.42* |
| High dose of AM06 live bacteria | 6.44 ± 1.04 | 14.59 ± 3.38* | 3.13 ± 1.26* |

TABLE 11-continued

Fasting blood glucose, serum insulin, and insulin resistance indexes (mean ± SD) for each group of rats

| Group | FBG (mmol/L) | Fins (mIU/L) | HOMA-IR |
|---|---|---|---|
| AM02 live bacteria | 6.61 ± 1.13 | 16.62 ± 3.41 | 3.32 ± 1.33* |
| AM06 live bacteria + atorvastatin calcium | 5.16 ± 1.12* | 12.61 ± 3.22* | 2.89 ± 0.49** |
| AM06 inactivated bacteria | 6.74 ± 1.33 | 16.58 ± 3.57 | 3.59 ± 1.52* |
| AM02 inactivated bacteria | 6.94 ± 1.09 | 18.75 ± 2.94 | 3.70 ± 1.02* |

Note:
*indicates significant difference p < 0.05 and
**indicates extremely significant difference p < 0.01, compared with the model group.

MS is a group of clinical syndromes characterized mainly by obesity, hyperglycemia, hypertension, etc., and the common pathological bases are insulin resistance and hyperinsulinemia. Insulin resistance is mainly manifested by a sustained increase in FBG, Fins, and HOMA-IR.

As shown in Table 11, the FBG, Fins, and HOMA-IR of the model group were significantly increased compared with the normal control group. Compared with the model group, each of the treatment groups down-regulated FBG and Fins levels in rats.

Compared with the model group, each of the treatment groups significantly down-regulated the HOMA-IR level in rats. This indicates that AKK bacteria can effectively reduce insulin resistance of rats and regulate blood glucose metabolism of rats.

6.2.3. Tail Artery Systolic Blood Pressure

TABLE 12

Tail artery systolic blood pressure (mean ± SD) of each group of rats

| Group | SBP (mmHg) |
|---|---|
| Normal control | 110.20 ± 33.26* |
| Model | 162.80 ± 25.70 |
| Positive drug | 123.42 ± 31.01 |
| Low dose of AM06 live bacteria | 134.99 ± 27.13 |
| High dose of AM06 live bacteria | 121.78 ± 28.60* |
| AM02 live bacteria | 135.68 ± 31.26 |
| AM06 live bacteria + atorvastatin calcium | 108.63 ± 29.45* |
| AM06 inactivated bacteria | 131.55 ± 34.60 |
| AM02 inactivated bacteria | 142.00 ± 29.89 |

Note:
*indicates significant difference p < 0.05 and
**indicates extremely significant difference p < 0.01, compared with the model group.

As shown in Table 12, the SBP of the rats in the model group was significantly increased compared with the normal control group. Compared with the model group, each of the treatment groups down-regulated blood pressure in rats. In the AKK bacteria groups, the AM06 and the inactivated bacteria thereof had a better effect than that of AM02. This indicates that AKK bacteria can effectively regulate blood pressure in rats.

6.2.4. Serum Lipid Indexes

TABLE 13

Serum lipid indexes of each group of rats (mean ± SD)

| Group | TC(mmol/L) | TG(mmol/L) | LDL-c(mmol/L) | HDL-c(mmol/L) |
|---|---|---|---|---|
| Normal control | 1.37 ± 0.55* | 0.62 ± 0.31* | 1.00 ± 0.27* | 1.07 ± 0.32* |
| Model | 2.17 ± 0.52 | 1.80 ± 0.32 | 1.92 ± 0.22 | 0.53 ± 0.30 |
| Positive drug | 1.44 ± 0.77* | 0.73 ± 0.28* | 1.14 ± 0.31* | 0.85 ± 0.25* |
| Low dose of AM06 live bacteria | 1.59 ± 0.66 | 0.81 ± 0.25* | 1.21 ± 0.28* | 0.77 ± 0.30 |

TABLE 13-continued

Serum lipid indexes of each group of rats (mean ± SD)

| Group | TC(mmol/L) | TG(mmol/L) | LDL-c(mmol/L) | HDL-c(mmol/L) |
|---|---|---|---|---|
| High dose of AM06 live bacteria | 1.33 ± 0.41* | 0.71 ± 0.34* | 1.08 ± 0.24* | 0.92 ± 0.23 |
| AM02 live bacteria | 1.49 ± 0.69* | 0.87 ± 0.30* | 1.17 ± 0.28 | 0.88 ± 0.32 |
| AM06 live bacteria + atorvastatin calcium | 1.40 ± 0.47* | 0.55 ± 0.30* | 0.89 ± 0.33* | 1.16 ± 0.42* |
| AM06 inactivated bacteria | 1.56 ± 0.36 | 0.83 ± 0.43* | 1.21 ± 0.25* | 0.75 ± 0.33 |
| AM02 inactivated bacteria | 1.72 ± 0.65 | 0.99 ± 0.25* | 1.32 ± 0.30 | 0.65 ± 0.34 |

Note:
*indicates significant difference $p < 0.05$, compared with the model group.

As shown in Table 13, compared with the normal control group, the levels of TC, TG, and LDL-c of the model group were significantly increased and the level of HDL-c was significantly decreased, indicating the symptoms of hyperlipidemia of metabolic syndrome. Compared with the model group, the TC, TG, and LDL-c levels of rats in the positive drug group were significantly decreased, and the HDL-c level was significantly increased.

Compared with the model group, the TC, TG, and LDL-c levels of rats in each group of AKK bacteria were decreased, wherein the TG level had a significant difference; the LDL-c levels of rats in each group of AM06 and inactivated bacteria thereof had a significant difference.

Compared with the model group, the HDL-c levels of rats in each group of AKK bacteria were increased. This indicates that AKK bacteria can effectively regulate the blood lipid metabolism of rats.

In conclusion, *Akkermansia muciniphila*, in particular, any one or a combination thereof of *Akkermansia muciniphila* AM06 with a deposit number of CGMCC No. 22793 and *Akkermansia muciniphila* AM02 with a deposit number of CGMCC No. 22794 can effectively treat metabolic syndrome of rats.

Technical features in the above embodiments and examples may be combined in any suitable combination. For simplicity of description, not all possible combinations of the technical features in the above embodiments and examples are described. However, the combinations of the technical features are all to be considered as falling within the scope described in this specification provided that they do not conflict with each other.

The above examples only show several embodiments of the present application, so as to facilitate the detailed understanding of the technical solutions of the present application, but should not be construed as limiting the scope of the present application. It should be noted that various changes and modifications can be made by those of ordinary skill in the art without departing from the ideas of the present application, and these changes and modifications are all within the scope of the present application. Furthermore, it should be understood that after reading the above teachings of the present application, those skilled in the art may make various changes or modifications to the present application, and the resulting equivalents may fall within the scope of the present application. It should also be understood that technical solutions obtained by logical analysis, reasoning or limited experiments based on the technical solutions provided by the present application by those skilled in the art are all within the scope of the present application as set forth in the appended claims. Therefore, the scope of the present application should be determined by the content of the appended claims, and the specification and drawings can be used to explain the content of the claims.

The invention claimed is:

1. A method for improving metabolic syndrome, the method comprising: administering to a subject a therapeutically effective amount of *Akkermansia muciniphila* AM06, or a therapeutically effective amount of a pharmaceutical composition comprising the *Akkermansia muciniphila* AM06, wherein the *Akkermansia muciniphila* AM06 was deposited in the China General Microbiological Culture Collection Center on Jun. 28, 2021 with a deposit number of CGMCC No. 22793;

wherein improvement of the metabolic syndrome comprises at least one of preventing and treating metabolic syndrome.

2. The method according to claim 1, wherein the pharmaceutical composition comprises the *Akkermansia muciniphila* AM06 and further comprises *Akkermansia muciniphila* AM02, wherein the *Akkermansia muciniphila* AM02 was deposited in the China General Microbiological Culture Collection Center on Jun. 28, 2021 with a deposit number of CGMCC No. 22794.

3. The method according to claim 1, wherein the *Akkermansia muciniphila* AM06 is a live bacterium, an inactivated bacterium or a combination thereof.

4. The method according to claim 2, wherein the *Akkermansia muciniphila* AM06 and the *Akkermansia muciniphila* AM02 are each independently live bacteria, inactivated bacteria, or a combination thereof.

5. The method according to claim 1, wherein the pharmaceutical composition comprises the *Akkermansia muciniphila* AM06 and a pharmaceutically acceptable carrier.

6. The method according to claim 1, wherein the pharmaceutical composition consists of the *Akkermansia muciniphila* AM06 and a pharmaceutically acceptable carrier.

7. The method according to claim 1, wherein pharmaceutical composition is suitable for use in humans or other mammals.

8. The method according to claim 1, wherein the pharmaceutical composition comprising the *Akkermansia muciniphila* AM06 is a composite probiotic, and the composite probiotic further comprises a probiotic different from the *Akkermansia muciniphila* AM6.

9. The method according to claim 8, wherein the probiotic different from the *Akkermansia muciniphila* AM06 is selected from one or more of *Saccharomyces boulardii*, *Christensenella minuta*, *Lactobacillus casei*, *Lactobacillus rhamnosus*, *Lactobacillus gasseri*, *Lactobacillus plantarum*, *Lactobacillus curvatus*, *Bifidobacterium infantis*, *Bifidobacterium longum*, and *Bifidobacterium breve*.

10. The method according to claim 1, wherein the pharmaceutical composition comprising the *Akkermansia muciniphila* AM06 further comprises a second active ingredient, and the second active ingredient is a medicament different from the *Akkermansia muciniphila* AM06.

11. The method according to claim 10, wherein the second active ingredient comprises one or more of orlistat, metformin, thiazolidinedione, fibrates, statins, and calcium ion antagonists, wherein the fibrates comprise one or more of fenofibrate, bezafibrate, and gemfibrozil; and the statins comprise one or more of atorvastatin, lovastatin, simvastatin, pravastatin, and Fluvastatin.

12. The method according to claim 10, wherein the second active ingredient is atorvastatin calcium.

13. A composition comprising *Akkermansia muciniphila*, wherein the composition comprises *Akkermansia muciniphila* and a second active ingredient;
wherein the *Akkermansia muciniphila* comprises *Akkermansia muciniphila* AM06;
wherein the *Akkermansia muciniphila* AM06 was deposited in the China General Microbiological Culture Collection Center on Jun. 28, 2021 with a deposit number of CGMCC No. 22793;
wherein the second active ingredient comprises one or more of orlistat, metformin, thiazolidinedione, fibrates, statins, and calcium ion antagonists;
wherein the fibrates comprise one or more of fenofibrate, bezafibrate, and gemfibrozil;
and wherein the statins comprise one or more of atorvastatin, lovastatin, simvastatin, pravastatin, and Fluvastatin.

14. The composition according to claim 13, wherein the composition further comprises *Akkermansia muciniphila* AM02, wherein the *Akkermansia muciniphila* AM02 was deposited in the China General Microbiological Culture Collection Center on Jun. 28, 2021 with a deposit number of CGMCC No. 22794.

15. The composition according to claim 14, wherein the *Akkermansia muciniphila* AM06 and the *Akkermansia muciniphila* AM02 are each independently live bacteria, inactivated bacteria, or a combination thereof.

16. The method according to claim 1, wherein the pharmaceutical composition is a medication; and wherein a dosage form of the pharmaceutical composition is a tablet, a capsule, a granule, a pill, an ointment, a solution, a suspension, an emulsion, a cream, a spray, a drop, a patch, or a tube feed formulation.

17. The method according to claim 2, wherein the pharmaceutical composition consists of the *Akkermansia muciniphila* AM06, the *Akkermansia muciniphila* AM02 and a pharmaceutically acceptable carrier.

18. The composition according to claim 13, wherein the *Akkermansia muciniphila* AM06 is a live bacterium, an inactivated bacterium or a combination thereof.

19. The composition according to claim 13, wherein the composition further comprises a probiotic different from the *Akkermansia muciniphila*, and wherein the probiotic different from the *Akkermansia muciniphila* comprises one or more of *Saccharomyces boulardii, Christensenella minuta, Lactobacillus casei, Lactobacillus rhamnosus, Lactobacillus gasseri, Lactobacillus plantarum, Lactobacillus curvatus, Bifidobacterium infantis, Bifidobacterium longum*, and *Bifidobacterium breve*.

20. A method for preventing and treating metabolic syndrome in a subject, the method comprising: administering a combination therapy comprising an effective amount of (1) *Akkermansia muciniphila* AM06 or a pharmaceutical composition comprising the *Akkermansia muciniphila* AM06, and (2) a second active ingredient,
wherein the *Akkermansia muciniphila* AM06 was deposited in the China General Microbiological Culture Collection Center on Jun. 28, 2021 with a deposit number of CGMCC No. 22793;
wherein the second active ingredient comprises one or more of orlistat, metformin, thiazolidinedione, fibrates, statins, and calcium ion antagonists;
wherein the fibrates comprise one or more of fenofibrate, bezafibrate, and gemfibrozil; and
wherein the statins comprise one or more of atorvastatin, lovastatin, simvastatin, pravastatin, and Fluvastatin.

* * * * *

```
                       SEQUENCE LISTING

Sequence total quantity: 2
SEQ ID NO: 1           moltype = DNA   length = 1423
FEATURE                Location/Qualifiers
source                 1..1423
                       mol_type = genomic DNA
                       organism = Akkermansia muciniphila
SEQUENCE: 1
gtgacgggcg gggtgcatag acatgcagtc gaacgagaga attgctagct tgctaataat    60
tctctagtgg cgcacgggtg agtaacacgt gagtaacctg cccccgagag cgggatagcc   120
ctgggaaact gggattaata ccgcatagta tcgaaagatt aaagcagcaa tgcgcttggg   180
gatgggctcg cggcctatta gttagttggt gaggtaacgg ctcaccaagg cgatgacggg   240
tagccggtct gagaggatgt ccggccacac tggaactgag acacggtcca gacacctacg   300
ggtggcagca gtcgagaatc attcacaatg ggggaaaccc tgatggtgcg acgccgcgtg   360
ggggaatgaa ggtcttcgga ttgtaaaccc ctgtcatgtg ggagcaaatt aaaaagatag   420
taccacaaga ggaagagacg gctaactctg tgccagcagc cgcggtaata cagaggtctc   480
aagcgttgtt cggaatcact gggcgtaaag cgtgcgtagg ctgtttcgta agtcgtgtgt   540
gaaaggcgcg ggctcaaccc gcggacggca catgatactg cgagactaga gtaatggagg   600
gggaaccgga attctcggtg tagcagtgaa atgcgtagat atcgagagga acactcgtgg   660
cgaaggcgcg ttcctggaca ttaactgacg ctgaggcacg aaggccaggg gagcgaaagg   720
gattagatac ccctgtagtc ctggcagtaa acggtgcacg cttggtgtgc ggggaatcga   780
ccccctgcgt gccggagcta acgcgttaag cgtgccgcct ggggagtacg gtcgcaagat   840
taaaactcaa agaaattgac ggggacccgc acaagcggtg gagtatgtgg cttaattcga   900
tgcaacgcga agaaccttac ctgggcttga catgtaatga acaacatgtg aaagcatgcg   960
actcttcgga ggcgttacaa caggtgctgc atggccgtcg tcagctcgtg tcgtgagatg  1020
```

```
tttggttaag tccagcaacg agcgcaaccc ctgttgccag ttaccagcac gtgaaggtgg  1080
ggactctggc gagactgccc agatcaactg ggaggaaggt ggggacgacg tcaggtcagt  1140
atggcccttc tgcccagggc tgcacacgta ctacaatgcc cagtacagag ggggccgaag  1200
ccgcgaggcg gaggaaatcc tgaaaactgg gcccagttcg gactgtaggc tgcaacccgc  1260
ctacacgaag ccggaatcgc tagtaatggc gcatcagcta cggcgccgtg aatacgttcc  1320
cgggtcttgt acacaccgcc cgtcacatca tggaagccgg tcgcacccga agtatctgaa  1380
gccaaccgca aggaggcagg tcctaaggta gactactgtc tat                    1423

SEQ ID NO: 2              moltype = DNA  length = 1420
FEATURE                   Location/Qualifiers
source                    1..1420
                          mol_type = genomic DNA
                          organism = Akkermansia muciniphila
SEQUENCE: 2
cggattacgg cgtgctaaga ctgcagtcga cgagagattg ctagcttgct aataattctc    60
tagtggcgca cgggtgagta acacgtgagt aacctgcccc cgagagcggg atagccctgg   120
gaaactggga ttaataccgc atagtatcga aagattaaag cagcaatgcg cttggggatg   180
ggctcgcggc ctattagtta gttggtgagg taacggctca ccaaggcgat gacgggtagc   240
cggtctgaga ggatgtccgg ccacactgga actgagacac ggtccagaca cctacgggtg   300
gcagcagtcg agaatcattc acaatggggg aaaccctgat ggtgcgacgc cgcgtggggg   360
aatgaaggtc ttcggattgt aaacccctgt catgtgggag caaattaaaa agatagtacc   420
acaagaggaa gagacggcta actctgtgcc agcagccgcg gtaatacaga ggtctcaagc   480
gttgttcgga atcactgggc gtaaagcgtg cgtaggctgt ttcgtaagtc gtgtgtgaaa   540
ggcgcgggct caacccgcgg acggcacatg atactgcgag actagagtaa tggaggggga   600
accggaattc tcggtgtagc agtgaaatgc gtagatatcg agaggaacac tcgtggcgaa   660
ggcgggttcc tggacattaa ctgacgctga ggcacgaaag cgcggggagc gaaagggatt   720
agataccccct gtagtcctgg cagtaaacgg tgcacgcttg gtgtgcgggg aatcgacccc   780
ctgcgtgccg gagctaacgc gttaagcgtg ccgcctgggg agtacggtcg caagattaaa   840
actcaaagaa attgacgggg acccgcacaa gcggtggagt atgtggctta attcgatgca   900
acgcgaagaa ccttacctgg gcttgacatg taatgaacaa catgtgaaag catgcgactc   960
ttcggaggcg ttacacaggt gctgcatggc cgtcgtcagc tcgtgtcgtg agatgtttgg  1020
ttaagtccag caacgagcgc aacccctgtt gccagttacc agcacgtgaa ggtggggact  1080
ctggcgagac tgcccagatc aactgggagg aaggtgggga cgacgtcagg tcagtatggc  1140
ccttatgccc agggctgcac acgtactaca atgcccagta cagaggggc cgaagccgcg  1200
aggcgggagga aatcctaaaa actgggccca gttcggactg taggctgcaa cccgcctaca  1260
cgaagccgga atcgctagta atggcgcatc agctacggcg ccgtgaatac gttcccgggt  1320
cttgtacaca ccgcccgtca catcatggaa gccggtcgca cccgaagtca ttactgaagc  1380
caaccgcaag gaggcaggtc ctaaagtgag actataacaa                        1420
```